US008238262B2

(12) United States Patent
Dimou

(10) Patent No.: US 8,238,262 B2
(45) Date of Patent: Aug. 7, 2012

(54) METHOD FOR SENDING ACKNOWLEDGEMENT MESSAGES WITHIN A WIRELESS COMMUNICATION NETWORK

(75) Inventor: Konstantinos Dimou, Langen (DE)

(73) Assignee: Panasonic Corporation, Osaka (JP)

( * ) Notice: Subject to any disclaimer, the term of this patent is extended or adjusted under 35 U.S.C. 154(b) by 945 days.

(21) Appl. No.: 12/096,886

(22) PCT Filed: Dec. 12, 2006

(86) PCT No.: PCT/EP2006/011946
§ 371 (c)(1),
(2), (4) Date: Sep. 11, 2008

(87) PCT Pub. No.: WO2007/068445
PCT Pub. Date: Jun. 21, 2007

(65) Prior Publication Data
US 2009/0028091 A1    Jan. 29, 2009

(30) Foreign Application Priority Data
Dec. 13, 2005    (EP) .................................... 05027218

(51) Int. Cl.
*G08C 15/00* (2006.01)
(52) U.S. Cl. ......... 370/252; 370/248; 370/328; 455/445
(58) Field of Classification Search .................. 370/241, 370/248, 249, 250, 252, 310, 328; 455/403, 455/422.1, 423, 435.1, 435.2, 445, 39, 68, 455/69
See application file for complete search history.

(56) References Cited

U.S. PATENT DOCUMENTS

| 6,760,599 | B1 * | 7/2004 | Uhlik ............................. 455/525 |
| 2003/0054812 | A1 * | 3/2003 | Hunzinger .................... 455/423 |
| 2003/0060201 | A1 * | 3/2003 | Soliman ....................... 455/442 |
| 2005/0185632 | A1 |  | 8/2005 | Draves |

FOREIGN PATENT DOCUMENTS

| WO | 2005/060302 | 6/2005 |
| WO | WO 2005060302 A1 * | 6/2005 |

OTHER PUBLICATIONS

International Search Report dated Mar. 5, 2007.

* cited by examiner

*Primary Examiner* — Chi Pham
*Assistant Examiner* — Weibin Huang
(74) *Attorney, Agent, or Firm* — Dickinson Wright PLLC

(57) ABSTRACT

The invention relates to a method for selecting a radio access point of a network, and a method for transmitting information on at least two radio access points of a network to a mobile terminal. Further the invention relates to an adapted mobile terminal and control entity for performing the methods, respectively. To minimize the transmission delays of acknowledgement messages sent from a mobile terminal to a control entity, the invention provides an access point selection mechanism that determines for a respective one of the at least two radio access points, a selection criterion associated to the respective radio access point. This selection criterion may be based on a transmission delay for sending acknowledgement messages via a respective access point to a control entity. Based on the determined selection criterion the mobile terminal selects one of the at least two radio access points, and sends an acknowledgement message to the control entity through the selected radio access point.

21 Claims, 14 Drawing Sheets

METHOD FOR SENDING ACKNOWLEDGEMENT MESSAGES WITHIN A WIRELESS COMMUNICATION NETWORK

TECHNICAL FIELD OF THE INVENTION

The invention relates to a method for selecting a radio access point of a network, and a method for transmitting information on at least two radio access points of a network to a mobile terminal. Further the invention relates to an adapted mobile terminal and control entity for performing the methods, respectively.

BACKGROUND OF THE INVENTION

In the recent years, a variety of widely spread wireless communication networks have been developed. These networks use different access technologies and range from wireless personal area networks to satellite based networks globally available. Between the above mentioned extremes, there are a variety of different networks and network technologies available that provide local, regional or country wide coverage, such as Bluetooth, Wireless-LAN using the IEEE 802.11 standard or cellular telecommunication networks such as GSM or UMTS.

Upon movement of a user, different network access technologies may be available to the user terminal. Small areas with a typical size of a building are often covered by networks using Bluetooth, DECT or wireless-LAN (W-LAN) technologies. In a private environment the user e.g. favors using a headset or the like supporting Bluetooth technology or using the service provided by a W-LAN hotspot, that is typically provided at airports or railway stations, internet cafes, etc.

In an urban environment the user terminal can be connected to a cellular network, whilst upon movement to a more rural area the service may be provided by a different network provider. So the network technology e.g. GSM or UMTS may remain unchanged but the access network and the service provider changes. Upon further location change, e.g. when the user crosses the borders of a country, the need for roaming between networks of different providers and even handovers between different network technologies very likely arises.

Or the user may move to areas where no network service is available except for satellite based network service. Also in this situation there may be the necessity to handoff the mobile terminal e.g. from a UMTS network to a satellite based network.

But not only the handoff of mobile terminals between different access networks and different access technologies, also parallel communication with different networks, network technologies or different access points may be of interest. Upon movement of a user to an airport or a railway station, it may be of interest to receive services e.g. an updated timetable via a local wireless LAN hotspot service (W-LAN), while remaining connected to e.g. a voice service provided by UMTS.

In summary, nowadays a user terminal upon movement may utilize a variety of different wireless communication networks, network technologies and services that are available.

Not only is it advantageous for the customer, it may also be desirable for the network service provider to handoff a mobile terminal from one network to another. For instance, it might be of interest to handoff the mobile terminal from a cellular network to a neighboring cellular network or in case the user enters a W-LAN hotspot zone to perform a handoff between the cellular network and the W-LAN network.

Different networks and network technologies can be tightly coupled with the aid of the Multi-radio Unification Protocol ("A Multi-Radio Unification Protocol for IEEE 802.11 Wireless Networks", Adya et. al, Proceedings of the first international conference on broadband networks, BROADNETS'04). This protocol is applicable to wireless communication networks such as IEEE 802.11 or UMTS. In such a heterogeneous network it is not only desired to handoff the mobile terminal easily across the various networks; the mobile terminal may also be capable of communicating with more than one radio access point at the same time, using the respective radio access technique the access point supports.

The option of parallel data transmission leads inter alia to an increase of reliability of the transmission and to higher data throughput. A further advantage of parallel transmission is the optimized use of different bandwidths offered by the respective access point, i.e. the respective radio access technique. Data related to different applications such as voice service or data download may be provided to the mobile terminal using a radio access technique offering the appropriate bandwidth, e.g. IEEE802.11 may be used for high speed data packet services and UMTS may be used for the voice services.

It may be even possible within one application that e.g. the audio stream is provided by the radio access technique offering the lower bandwidth and the video stream is provided by the radio access technique offering the higher bandwidth. Additional to bandwidth also the data delay is desired to be in a certain range appropriate to the specific application. Some applications e.g. data download are delay insensitive, other like Voice-over-IP (VoIP) or video streaming are not.

In radio access networks, transmission of the same data flow via different radio access points is possible at different transmission time intervals (TTI). This possibility implies the switching of the radio access point and radio access technique respectively, through which data transmission is done. This radio access switching may be in certain cases very dynamic, e.g., sometimes it can be done at a TTI level.

In order to provide best quality of service to the mobile terminal in these radio access networks a multi-radio Automatic Repeat Request (ARQ) mechanism is typically implemented. The term multi-radio ARQ means that link layer acknowledgements for data packets can be transmitted via a different radio access point than the one used for the data transmission. The motivation for introducing multi-radio ARQ is to avoid cases, where the radio access point switching periods may be very long. This might happen, in some cases when data and acknowledgement transmission is done via the same radio access point, as the delay on uplink and downlink may be significantly different.

To allow very dynamic radio access point switching in presence of delay intolerant services provided to the mobile terminal (e.g. Voice-over-IP or video streaming), it is desirable that acknowledgement messages for data packets are transmitted without considerable delays or at least with delays that are not higher than the ones observed in the case of absence of multi-radio ARQ mechanisms. Further, in order to prevent abnormal situations in the sense that e.g. data streaming stagnates or needless retransmissions of data packets occur, due to missing acknowledgement messages it is desirable to send acknowledgement messages as fast as possible.

SUMMARY OF THE INVENTION

The object of the invention is to minimize the transmission delay of acknowledgement messages sent from a mobile terminal to a control entity.

The problem is solved by the subject matter of the independent claims. Advantageous embodiments of the invention are subject matter of the dependent claims.

One embodiment of the invention provides a method for selecting a radio access point of a network through which delivery of packets of a packet data service to a mobile terminal are to be acknowledged. The network comprises a control entity controlling acknowledgement of the delivery of packets of the packet data service to the mobile terminal. The mobile terminal receives packets of the packet data service via at least two radio access points.

Further the mobile terminal determines for a respective one of the at least two radio access points, a selection criterion associated to the respective radio access point. This selection criterion is e.g. based on an expected transmission delay experienced by an acknowledgement message on at least a part of a transmission path from the mobile terminal to the control entity via the respective radio access point. Based on the determined selection criterion the mobile terminal selects one of the at least two radio access points. Finally, at least one acknowledgement message is sent by the mobile terminal to the control entity through the selected radio access point.

In another embodiment of the invention the selection criterion is the expected transmission delay for an acknowledgement message sent from the mobile terminal via the respective access point to the control entity. The acknowledgement message is sent to the radio access point offering the minimum transmission delay.

The advantage of this embodiment is that by directly taking the expected transmission delay as a selection criterion, the overall minimization of transmission delays may be obtained efficiently. Thereby, situations caused by missing acknowledgement messages, such as needless retransmissions or abnormal situations such as stuck of data flow may be prevented.

According to a further embodiment of the invention, the channel quality of a channel between the communication terminal and the respective radio access point is additionally taken into account for determination of the selection criteria.

The advantage of introducing the channel quality as a further selection criterion in this embodiment is that the reliability for sending acknowledgement messages through an access point offering a low delay can be further improved in this way. The values of transmission delay and channel quality may also be advantageously combined to form the selection criterion.

In a further embodiment of the invention, the procedure of selecting a radio access point for sending acknowledgement messages is performed by the mobile terminal upon each reception of a data packet or in a periodical manner.

Two advantages may be thereby achieved. First, the transmission delay of acknowledgement messages sent from the user equipment to the control entity can be minimized in that access point selection is done on a per packet basis enabling the selection mechanism to follow dynamic access point switching. Second, computing time and battery power within the mobile terminal may be saved in that the access point selection mechanism is only executed e.g. after a certain time interval or after a certain number of received data packets.

According to another embodiment of the invention, the procedure of selecting a radio access point is performed event-triggered.

This embodiment may be advantageous e.g. in case the transmission delay for sending acknowledgement messages to a certain radio access point exceeds a given threshold value and a system reaction to this event is desired. In this case, it may be e.g. reasonable to find another access point offering a lower transmission delay. Another situation, where a reselection of the access point to send acknowledgements to may be performed when the mobile terminal enters into a handover.

In another embodiment of the invention, the values of the selection criterion determined for a respective radio access point are averaged. This averaged value is taken as a basis for a new selection criterion.

This embodiment may be advantageous in that it can be prevented that statistical fluctuations of transmission delays, likely to happen on a wired part of a connection, negatively impacting the radio access point selection. Thereby needless and frequent switching of the radio access point by the mobile terminal can be prevented.

According to a further embodiment of the invention, the identification (for example a transport layer address) of the control entity is communicated from the mobile terminal to the new radio access point upon set up of a new connection.

In another embodiment of the invention, the transmission delays for sending acknowledgement messages from the mobile terminal to the control entity are requested from the network. In case this information is available in the network, this embodiment is advantageous in that unnecessary determination of the transmission delay by the mobile terminal may be prevented.

According to another embodiment of the invention the radio access points in the network, the mobile terminal and the control entity implement the Multi-Radio-Unification Protocol (MUP).

The above mentioned embodiments of the invention relate to the mobile terminal, and the selection method performed by the mobile terminal. On the network side a control entity can provide a packet data service to the mobile terminal and may receive acknowledgement messages for the respective data packets.

Another embodiment of the invention provides a method for transmitting information on at least two radio access points of a network to a mobile terminal. The network comprises a control entity controlling acknowledgement of the delivery of packets of a packet data service to the mobile terminal. The control entity sends packets of the packet data service to the mobile terminal via the at least two radio access points. Further, the control entity determines for a respective one of the at least two radio access points, information on an expected transmission delay experienced by an acknowledgement message on at least a part of a transmission path from the mobile terminal to the control entity via the respective radio access point. The control entity transmits the information on the expected transmission delay to the mobile terminal, and receives at least one acknowledgement message from the mobile terminal via a radio access point selected by the mobile terminal based on the experienced transmission delay.

According to another embodiment of the invention, the control entity controlling delivery of data packets of a data packet service to the mobile terminal is located in one of the at least two radio access points.

The control entity is a functional entity, and by integrating this functional entity in a radio access point, further transmission of data and acknowledgement messages via additional wired or wireless connections causing further transmission delays may be omitted.

In another embodiment of the invention, each of the at least two radio access points is connected to the mobile terminal via at least one communication channel. The control entity determines information on a channel quality of the respective channel to the mobile terminal, for a respective one of the at least two radio access points, and communicates the information on the channel quality to the mobile terminal.

In a further embodiment of the invention, the control entity determines and transmits information on the transmission delays or the channel qualities periodically, upon each reception of a data packet or upon request to the mobile terminal.

According to a further embodiment of the invention the control entity averages the values of transmission delays or channel qualities determined for a respective radio access point and communicates this averaged values to the mobile terminal.

In another embodiment of the invention the control entity communicates its address to the mobile terminal upon setup of a new connection between the mobile terminal and a new radio access point.

According to another embodiment of the invention, the transmission delay an acknowledgement message experiences on at least a part of the path from the mobile terminal to the control entity is determined by sending probe messages from the mobile terminal to the control entity. A probe message contains a timestamp and is sent from the mobile terminal via the respective radio access point to the control entity. This probe message may also be requested by the control entity (20). The control entity (20) evaluates the timestamp in the probe message and communicates the determined transmission delay to the mobile terminal.

This mechanism may be used for each of the radio access points, to which the mobile terminal is connected. As a result, the selection of the radio access point to which acknowledgement messages shall be send may be performed by the mobile terminal based on the determined transmission delays.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Before discussing the different exemplary embodiments of the invention, the term control entity frequently used in the following will be defined.

The control entity is a functional entity independent of its physical implementation. It may be realized by hardware elements; equally it may be implemented in software or a combination of hardware and software elements. It is capable of providing a packet data service to a mobile terminal. Further, it receives acknowledgement messages for the respective data packets and depending on whether a negative or positive acknowledgement message is received, the control entity is capable of performing retransmissions and may maintain a retransmission buffer for this purpose. When implementing MUP, the retransmission buffer is typically referred to as the MUP-buffer.

Figure 1:
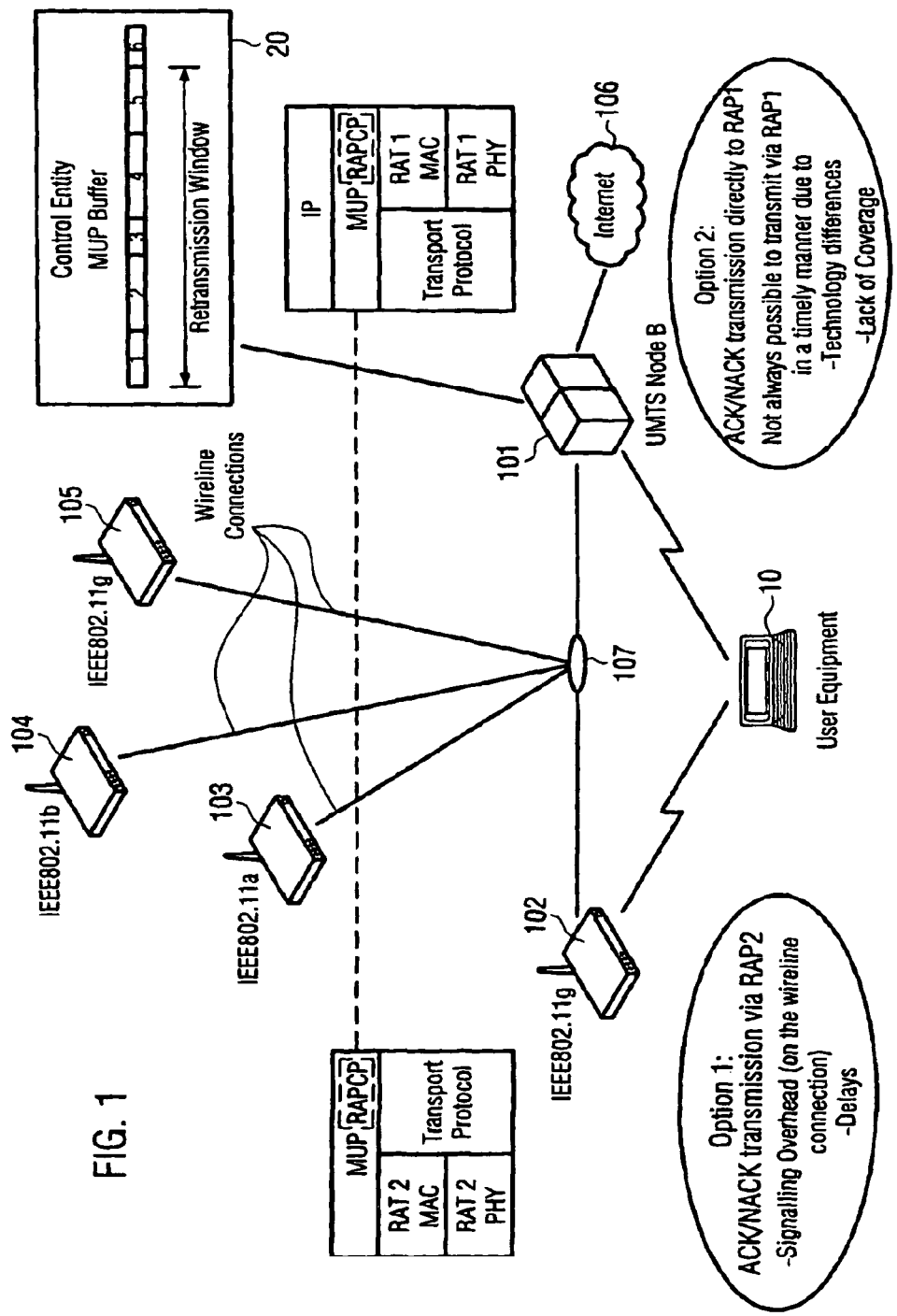
FIG. 1 shows a network scenario wherein a user equipment is connected to a UMTS Node B and an IEEE 802.11g access point.

FIG. 1 shows a network scenario wherein a user equipment 10 is connected to a UMTS Node B and an IEEE 802.11g access point. Access point 101 is a UMTS node B, access point 102-105 are W-LAN hotspots supporting different variants of the IEEE 802.11 standard. In particular, access points 102 and 105 support IEEE 802.11g, access point 103 supports IEEE 802.11a and access point 104 supports IEEE 802.11b. The cooperation of UMTS and IEEE 802.11 is exemplarily depicted because this combination is the most likely one to appear in the near future. Technology specific issues are put into consideration as well.

The invention is not limited to these kinds of networks, it can be applied to a variety of different heterogeneous networks. Such a heterogeneous network may comprise network technologies such as the aforementioned different IEEE 802.11 standards, UMTS and its evolutions, CDMA 2000, Bluetooth, GSM, standards for satellite communication, etc.

Also a scenario wherein all access points support the same access technology can be imagined, e.g. a network of IEEE 802.11g access points. Also different network topologies may be realized e.g. in that additional gateways to other communication networks exist or the control entity 20 is located in another radio access point, a different network layer or in a different network system.

A data packet service, e.g. a streaming service from the Internet 106, can be provided to the user equipment 10 via access point 102. The data packets downloaded from the Internet 106 are forwarded by the control entity 20 to the access network. The downloaded data is transmitted along a path using the wired link from access point 101 via the network router 107 to access point 102, and finally reaching the user equipment 10 via the air interface.

The user equipment 10 is simultaneously communicating with the control entity 20 via a UMTS Node B (access point 101) and a wireless LAN access point 102. The access points may implement the Multi-Radio-Unification Protocol (MUP). The control entity 20 may be located in access point 101. A MUP-buffer providing data packets for transmission and retransmission of a data packet service to the user equipment 10 may be further a part of the control entity 20. Acknowledgements for acknowledging the delivery of data packets of the data packet service are evaluated by the control entity 20.

The connection between access point 101 and access point 102 is a wired link. Transmission delays on wired data links usually depend on the traffic load on the respective link. The load due to uplink and downlink traffic on a single link can be different from each other, and therefore uplink and downlink transmission delays are typically not equal. Apart from that, the link may be shared among different network components and hence the delay may exhibit high variance due to the varying load that is transported in the shared wire. In the network scenario shown in FIG. 1 the traffic load on the wired connection from the network hub 107 to access point 101 is typically high due to uplink traffic caused by the access points access points 103-105. As mentioned above the data packet service is provided to the user equipment 10 via access point 102. When the MUP Physical Data Unit (PDU) transmission takes place via access point 102, the acknowledgement can be sent via access point 102, as well. The delay for transmission of an acknowledgement messages, sent from the user equipment 10 to the control entity 20 located in access point 101 might vary significantly, and is therefore not the optimal solution.

A first drawback is that transmission of acknowledgement messages via the cable connecting access point 102 and access point 101 may overload the link, if this connecting cable is shared for uplink and downlink traffic and if this same cable is used for the connection of different access points with the control entity 20 containing the MUP buffer, as mentioned above.

The second drawback is that significant delays in the acknowledgement transmissions may be encountered, as already outlined. These drawbacks can be overcome if point-to-point connections are used for uplink and downlink and for the link between the access point containing the MUP buffer and the other access points. This solution however, is very likely to be prohibitively expensive for an operator, in case of several interconnected access points. The reason is that these cables/lines have to be very fast and hence they are high-priced.

An alternative for acknowledgement transmission, when the MUP PDU transmission takes place via access point 102, is to transmit the acknowledgement messages directly to the control entity 20 i.e. access point containing the MUP buffer, in the present case access point 101. This alternative involves transmission of acknowledgement via another access point than the one used for the data transmission. This option may lead to a faster acknowledgement transmission, provided that the technology restrictions (mostly in the hardware, i.e. delays involved with the dynamic change of the RF circuit, etc., . . . ) are not introducing significant delays. Another point to be considered, in order to avoid losses in the transmission of acknowledgements, is that it has to be guaranteed that the user equipment 10 is still within the coverage area of access point 101. A unique decision for the whole communication session, e.g. always transmit acknowledgements directly to access point 101, is not the optimal solution.

In the following and alternative network scenario will be discussed in terms of fast acknowledgement transmission.

Figure 2:
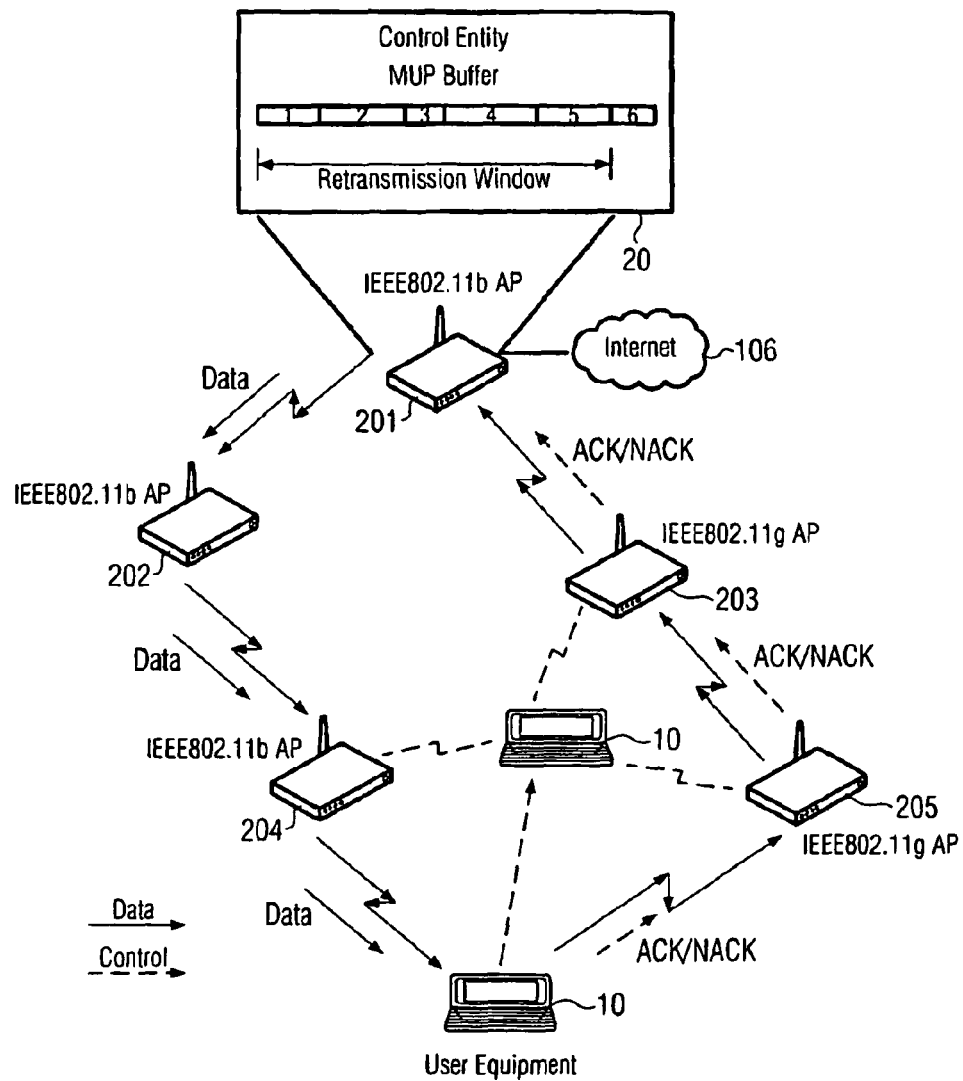
FIG. 2 shows a network architecture of a multi hop, ad-hoc or mesh network, wherein user equipment is connected via two IEEE 802.11g access points to the control entity.

FIG. 2 shows a heterogeneous network architecture of a multi hop, ad-hoc or mesh network, wherein user equipment 10 is connected via two IEEE 802.11g access points to the control entity 20. The depicted radio access points support different generations of the IEEE 802.11 technology. The control entity 20 is located in access point 201 in this exemplary embodiment. A packet data service, e.g. a data streaming from the Internet 106, is provided to the user equipment 10 via a path using the access points 201, 202 and 204. Acknowledgement messages are sent using the transmission path via access points 205, 203 and 201.

Upon movement, the user equipment 10 may reach coverage of different hot-spots. In the given example it shifts from the coverage area of access point 204 and 205 to the coverage area of access point 203, 204 and 205. Upon detection that entering a new coverage area from access point 203, the user equipment 10 establishes a new connection to access point 203.

In order to send an acknowledgement as fast as possible from the user equipment 10 to the control entity 20, it may be advantageous to send the acknowledgement message via access point 203 instead of sending it via access point 205, given that the transmission delay via new access point 203 is lower than via access point 205. A static solution to receive data from a first access point and send acknowledgements via a second access point, as discussed in the preceding paragraphs may be not appropriate. One reason is that a static solution does not take into account the delay an acknowledgment message really experiences on its way from the user equipment 10 to the control entity 20.

It is one aspect of the invention to propose a solution for efficient feedback in case of coupling different radio access technologies i.e. in heterogeneous networks. The invention is also applicable to control signaling in general, in the case of coupled radio access technologies with the aid of MUP. As outlined above, the interconnection of the different access points providing different radio access technologies can lead to high values and high variance of transmission delays for sending acknowledgement messages. The invention proposes mechanisms allowing to provide efficient feedback by providing inter alia a new mechanism for selecting one of a plurality of access points via which feedback is provided to the control entity 20 thereby minimizing the delay experienced by the feedback messages.

When different radio access technologies are coupled using the multi radio unification protocol (MUP), it is likely to happen that the MUP sliding window controlling the transmission of data might stop when acknowledgements arrive with a high and varying delay. Long delays of the (negative) acknowledgement transmission would also require large retransmission window sizes and consequently a high amount of hardware memory. These drawbacks may be overcome when implementing the present invention.

Further, according to some embodiments of the invention, the radio access points can be switched very dynamically even at a TTI-level. In the case the radio access points are coupled using the MUP protocol, MUP can operate on top of layers 1 and 2 and providing a uniform data link layer processing. MUP can contain a unique link layer buffer (MUP buffer) containing higher layer packet data to be transmitted by the underlying radio access technologies. In this case, retransmissions of non-acknowledged Physical Data Units (PDU) can be done via different radio access technologies than the one used for the first transmission of the designated PDU. In case of very dynamic radio access point switching (e.g. on TTI level), transmission of (negative) acknowledgements via one of the available radio access points improves the handling of acknowledgement messages. Otherwise, if data and acknowledgement transmission are sent via the same radio access point this would involve considerable delays, which would then prohibit the dynamic radio access point switching.

Further, the very dynamic access point selection, so as to follow dynamic channel variations, intensifies the requirement for timely transmission of acknowledgements. In heterogeneous wireless communication networks like the ones depicted in FIGS. 1 and 2, the different access points and different access technologies may be coupled with the aid of the Multi-Radio-Unification Protocol (MUP). Data packets are sent from an access point containing an MUP buffer via a certain transmission path to the user equipment 10. In a network shown in FIG. 2 data packets are sent from the control entity 20 located in access point 201 via access points 202 and 204 to the user equipment 10. In this network scenario, access point 202 and 204 are not necessarily fully MUP enabled, i.e. the access points forward MUP data packets without opening or reading the data packets. In the same network situation, access point 202 and 204 can contain a buffer for storing data packets prior to transmission. The access points may forward data packets without providing any additional functionality.

In the following, different exemplary embodiments of the invention related to the user equipment 10 will be discussed.

Figure 3:
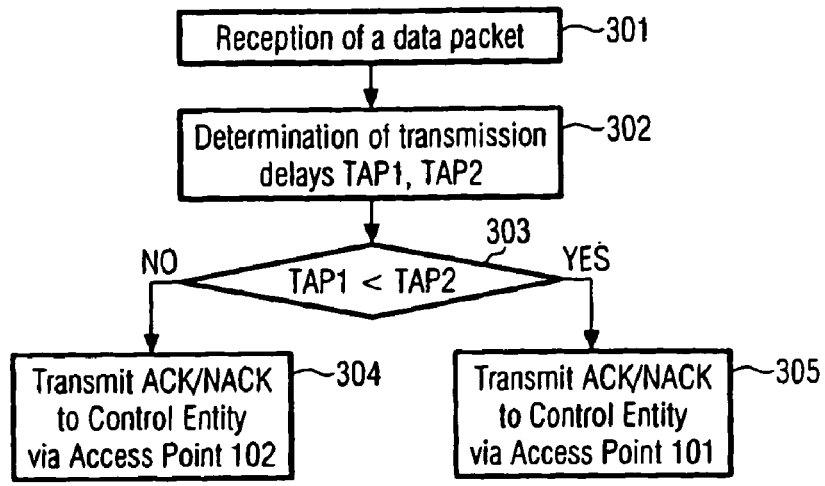
FIG. 3 shows a flow-chart of a method for selecting an access point for sending acknowledgement messages according to an embodiment of the invention.

FIG. 3 shows a flow-chart of a method for selecting an access point for sending acknowledgement messages according to an embodiment of the invention. In this example, the method steps are carried out by the user equipment 10. It may be assumed the user equipment 10 is situated in a network as exemplarily depicted in FIG. 1. The user equipment 10 is connected to the control entity via two access points, access point 101 and access point 102.

The user equipment 10 receives a data packet 301 via one or both of the afore mentioned access points. Further, for a respective one of the available access points the uplink transmission delays TAP1 and TAP2 are determined 302. TAP1 represents the uplink transmission delay for sending an acknowledgement message from the user equipment 10 via access point 101 to the control entity 20. Accordingly, TAP2 is the expected transmission delay for sending an acknowledgement via access point 102 to the control entity 20. The determination of transmission delays can be carried out in different ways. One option is to send probe messages from the user equipment 10 to the control entity 20 via each of the available access points to which the user equipment 10 is connected, i.e. access point 101 and 102. An additional option is to request the delay values TAP1 and TAP2 from the control entity or from an internal storage within the user equipment. Further details concerning the determination of uplink transmission delays by sending probe messages will be discussed with reference to FIGS. 10 and 11. In step 303, the comparison between TAP 1 and TAP 2 (TAP1<TAP2) is performed. In caseTAP1 is smaller than TAP 2, the acknowledgement message is sent 305 via access point 101 to the control entity 20. In case TAP 1 is longer than TAP2, the acknowledgement message is sent 304 via access point 102 to the control entity 20. In this example the measured transmission delays are taken as the criteria for selecting the access point through which feedback is provided.

The invention is not limited to the case the user equipment 10 is connected via two access points. The flow-chart presented in FIG. 3 can be adapted to scenarios wherein the user equipment 10 is connected via more than two access points. In the case the user equipment 10 is connected via a plurality of access points, the step of determining 302 expected transmission delays for sending acknowledgement messages via the respective access point determines transmission delays for all available access points. In the subsequent step the determined transmission delay values are compared 303, and acknowledgement messages are sent to the access point offering the minimum transmission delay.

The above described selection algorithm may be carried out after each reception of a data packet.

Figure 4:
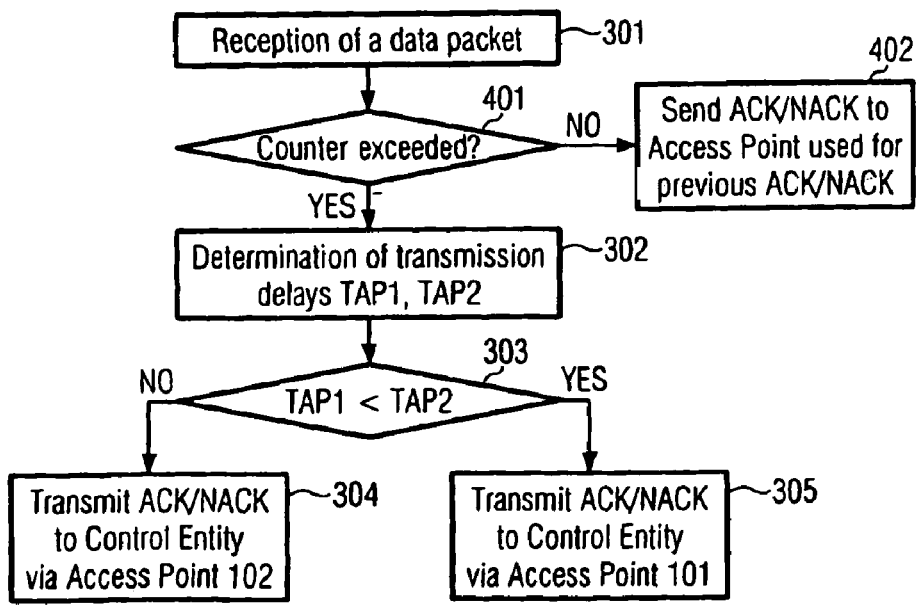
FIG. 4 depicts another flow-chart of a further exemplary method for selecting an access point to which acknowledgement messages are to be sent, according to an embodiment of the invention.

FIG. 4 depicts another flow-chart of a further exemplary method for selecting an access point to which acknowledgement messages are to be sent, according to an embodiment of the invention. In this embodiment, a counter as a further selection criterion is added to the selection criterion of transmission delays. This alternative method may be performed by the user equipment 10. In the flow chart, a new step of counting 401 is introduced. The number of received data packets is counted and only in the case a certain number of data packets is reached, the further steps of determining transmission delays 302 and selecting an access point 303-305 as in FIG. 3 are performed. Otherwise, the acknowledgement message is sent via the access point used for transmission of the previous acknowledgement message 402.

Alternatively, the step of counting 401 may be also designed to allow proceeding with method steps 302 to 305 only, if a certain time is exceeded, a certain amount of data has been downloaded or the like.

In situations when access point switching is less dynamic, the introduction of a counter step 401 may speed up the method for selecting an access point because method steps 302-305 are omitted and may further result in lower battery power consumption of the user equipment.

Figure 5:
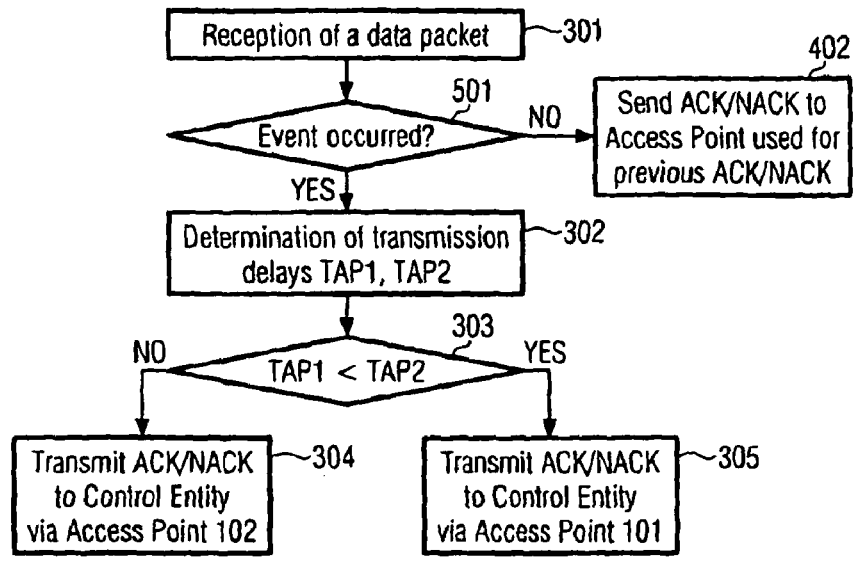
FIG. 5 shows a further flow-chart of another exemplary selection mechanism according to an embodiment of the invention, wherein the selection of an access point is based on transmission delays and an event.

FIG. 5 shows a further flow-chart of another exemplary selection mechanism according to an embodiment of the invention, wherein the selection of an access point is based on transmission delays and an event. The method may again be performed by the user equipment 10. Additional to FIG. 3 an event step 501 is introduced in the flow-chart. Upon reception of a data packet 301, it is determined whether a certain event has happened or not 501. Only in case a certain event occurred, the further steps of determining transmission delays 302 and selecting an access point 303-305 are performed. Otherwise, the acknowledgement message is sent via the access point used for transmission of the previous acknowledgement message 402.

By adding event step 501 to the selection mechanism, this last one can be optimized in that determination of transmission delays 302 and selection 303-305 of an access point are only performed, if a reselection of the access point to which acknowledgement messages are to be sent seems reasonable. The user equipment can save computing time by omitting the unnecessary method steps. A reasonable event can be the establishment of a new connection to an access point using a different radio access technique than the one used before.

Another event for reselecting a new access point through which feedback is to be provided by the user equipment 10 may be a reconfiguration of the Transmission-Time-Interval (TTI), as will be outlined below.

The reselection of the access point to provide feedback messages upon (re-) configuration of a new TTI will be exemplified in the following under reference to FIG. 1. In this example, it is assumed that the transmission delay for sending acknowledgement messages via access point 101 is smaller than the delay experienced by acknowledgement messages sent via access point 102, e.g. due to high traffic load on the wire line connection between access point 102 and access point 101.

Access point 101 may be a UMTS Node B. In this case, acknowledgement messages are transmitted via dedicated channels from the user equipment 10 to access point 101. The acknowledgements may have the highest priority, and are therefore not buffered prior to the transmission. The transmission delay is thus approximately equal to the configured TTI. Hence, the information on the transmission delay for acknowledgement messages sent via access point 101 is available in the user equipment 10, since the user equipment 10 is aware of the TTI used for communication with access point 101 (UMTS Node B).

The delay time for sending acknowledgement messages to the control entity 20 via access point 102 may be determined, e.g. by sending probe messages. The mechanism of sending this probe messages will be explained with reference to FIG. 10 or 11 below.

The delay times experienced by probe messages mainly depend on the traffic load of the link connecting access point 102 and the control entity 20 located in access point 101. Statistical fluctuations of transmission times are likely to happen on wired connections. In order to average this statistical fluctuations, the delay times signaled to the user equipment 10 can be processed, e.g. by calculating a floating average value.

As mentioned above, the TTI may be equal to the transmission delay for acknowledgement messages sent via access point 101, and may be smaller than the averaged delay value probe messages experienced when being sent via access point 102.

Upon TTI reconfiguration of the UMTS connection of the user equipment 10 to access point 101 (e.g. the TTI switches from 2 ms to 10 ms or higher), it may be advantageous to perform access point reselection to guarantee a minimum delay. If it is assumed that the wire line delay for sending acknowledgement messages via access point 102 is about 6 ms (as it is the case in one-to-one connection between the access point 101 and access point 102, see 3GPP TS 25.853, "Delay Budget within the Access Stratum", version 4.0.0, available at http://www.3gpp.org), the method according to FIG. 5 would decide to send acknowledgement messages via access point 102 instead of sending acknowledgement messages via access point 101.

In summary there may be certain events, e.g. TTI switching that justify the access point selection, triggered on this event. A further event to perform access point reselection may be the establishment of a new connection to an access point using a different radio access technique than the one used before.

The event step 501 in the flow chart described in FIG. 5 can be placed before or after the step of determining the transmission delays 302. Further, the embodiments presented in FIGS. 4 and 5 can be combined advantageously. Both steps, the counter step 401 and the event step 501 can be placed in arbitrary order before or after the step of determination of transmission delays 302.

Figure 6:
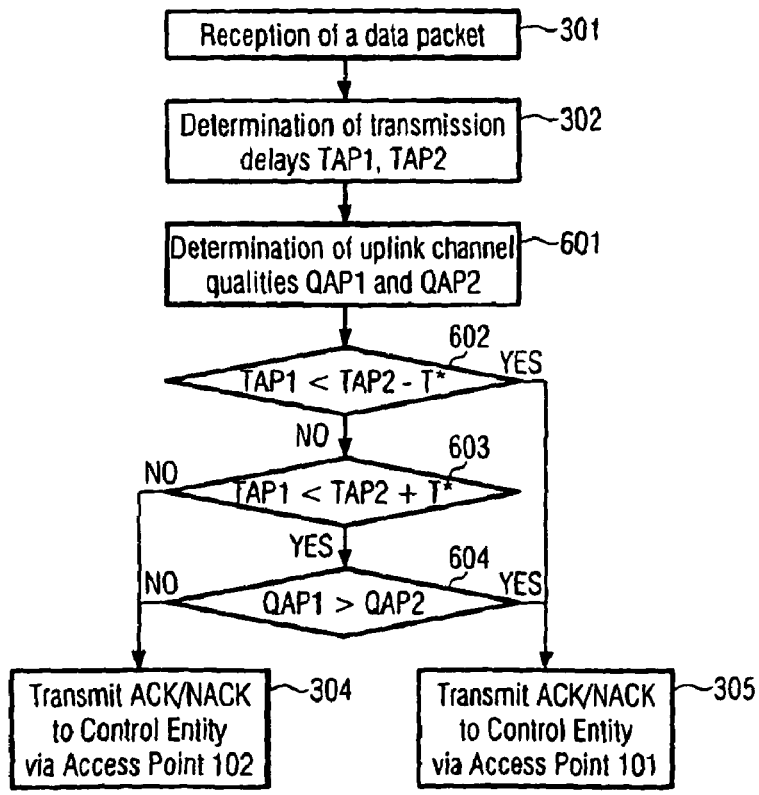
FIG. 6 depicts a flow-chart of an access point selection method according to another embodiment of the invention, wherein an access point is selected based on a transmission delay and a channel quality.

FIG. 6 depicts a flow-chart of an access point selection method according to another embodiment of the invention, wherein an access point is selected based on a transmission delay and a channel quality. The method may be executed by the user equipment 10, that can be situated in a network scenario like the one shown in FIG. 1.

Upon reception of a data packet 301, the uplink transmission delays TAP1 and TAP2 are determined 302. TAP1 and TAP2 designate the expected uplink transmission delays for sending acknowledgement messages from the user equipment 10 via access point 101 and 102 respectively to the control entity 20. Further details concerning the determination of uplink transmission delays by sending probe messages will be discussed with reference to FIGS. 10 and 11.

Further, the uplink channel qualities QAP1, QAP2 are determined 601, wherein QAP1, QAP2 designate the channel quality of a channel between the user equipment 10 and access point 101 and access point 102, respectively.

Next, it is tested whether the transmission delay via access point 101 is significantly shorter than the delay in case transmission is done via access point 102. In step 602 the comparison between TAP1 and TAP2 plus a value T* (TAP1<TAP2−T*) is performed. Preferential transmission via a certain access point may be of interest for various reasons.

If the transmission via access point 101 exhibits a significant lower delay than the transmission via access point 102, the acknowledgement message is transmitted 305 via access point 101.

If the transmission delay via access point 101 does not exhibit a significantly lower delay than the transmission via access point 102, it is tested whether the delay for sending acknowledgement messages via access point 101 is smaller than the delay for sending an acknowledgement via access point 102 plus the threshold value TV (TAP1<TAP2+T*). In case the transmission delay for sending acknowledgements via access point 101 is significantly higher than the transmission delay for sending acknowledgements via access point 102, the acknowledgement message is transmitted 304 via access point 102. In case the above-mentioned hypothesis is not true, the channel quality within both of the systems is compared and the acknowledgement message is transmitted via the access point for which the radio channel is of better quality 604. Hence, in case the channel quality of the radio link to the AP 101 is better than the radio link quality to AP 102 (QAP1>QAP2), then the acknowledgement message is sent 305 via access point 101; otherwise the acknowledgement message is sent 304 via access point 102.

It is apparent from this exemplary implementation of the access point selection that acknowledgement transmission to access point 102 is favored. This may be of interest for various reasons. The parameter T* that controls the degree of preferential transmission may be sent from the control entity 20 to the user equipment 10 at the beginning of the communication session. In case the strategy of the network changes during communication, a new parameter T* may be notified to the user equipment 10.

Figure 7:
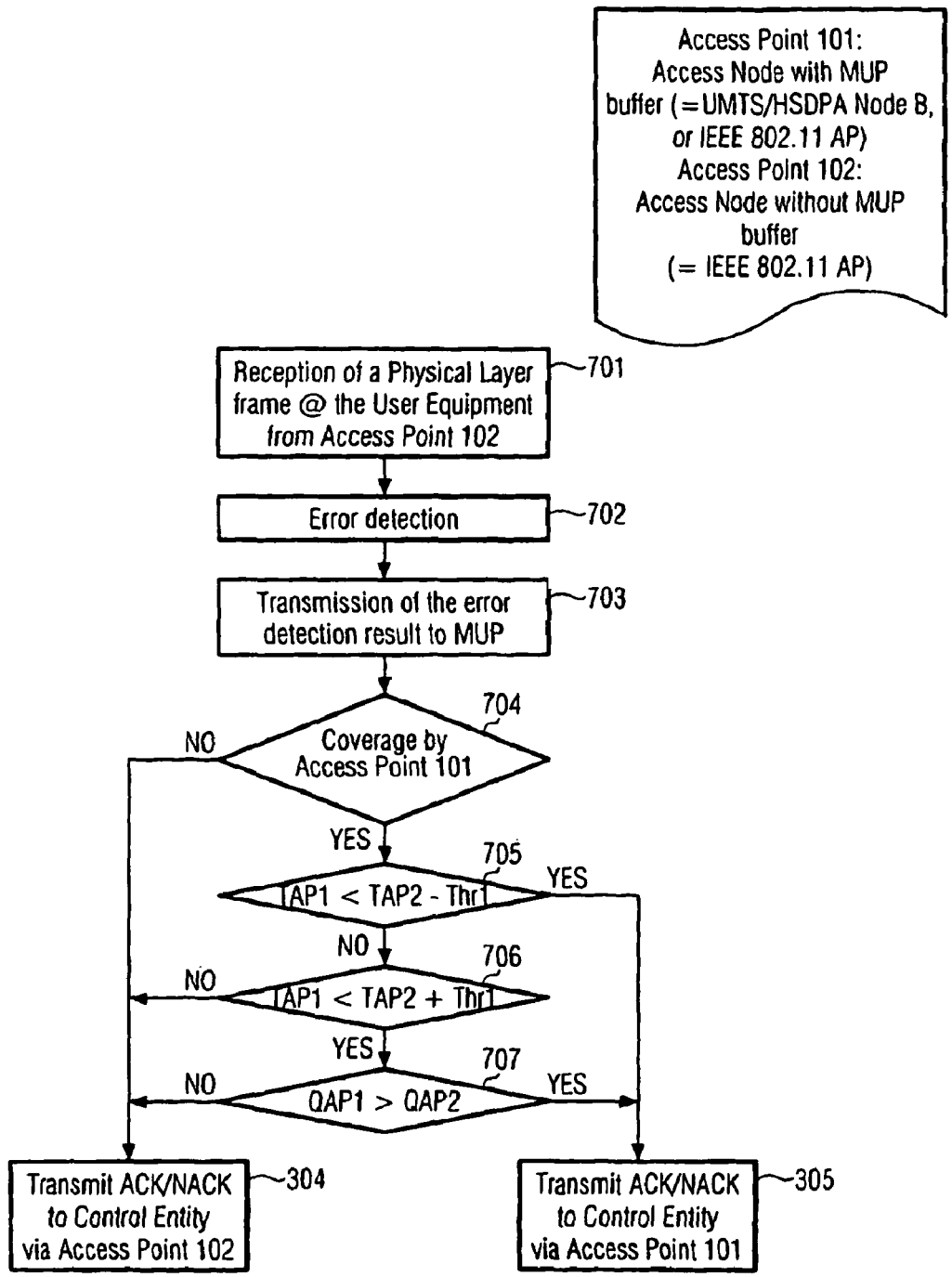
FIG. 7 shows a flow-chart of another method for selecting an access point for acknowledgment transmission according to an embodiment of the invention.

FIG. 7 shows a flow-chart of another method for selecting an access point for acknowledgment transmission according to an embodiment of the invention. In this embodiment the user equipment 10 may execute the individual steps of the flow-chart and may be situated in a network as the one shown in FIG. 1.

In FIG. 1, the access points may be assumed to be coupled by means of the Multi-Radio-Unification-Protocol (MUP). The MUP buffer storing data packets for transmission and retransmission is assumed to be located in access point 101. The selection sequence presented in FIG. 7 minimizes the transmission delay of acknowledgements sent to the access point containing the MUP buffer, while considering the reliability of transmission. The depicted sequence may be a part of the MUP protocol (within the user equipment 10).

Upon each data reception from access point 102 at physical layer 701, an error detection is performed at physical layer 702 and the result is made known 703 to the next higher protocol layer (MUP). Based on the result of this error detection 702, the sequence decides whether to send an acknowledgement or a negative acknowledgement to the control entity that transmits the subsequent data packet or retransmits the previous data packet. Data packets provided by the packet data service are provided by the MUP buffer, that may be also located in access point 101.

Upon reception 703 of the error detection result, MUP has to decide via which access technique the user equipment 10 is going to transmit the (negative) acknowledgement. The next step 704 is to check whether there is (still) coverage by access point 101. It is very unlikely to happen that at the moment of reception of the data packet, coverage by the transmitting access point 102 is lost, therefore the first test is to check coverage for access point 101. In case there is no coverage by access point 101, the acknowledgement (or the negative acknowledgement) is transmitted 304 via access point 102.

Usually, a user equipment 10 can detect the existence of coverage by listening the pilot channel in this system. In UMTS and its evolutions (HSDPA, Enhanced Uplink) a user equipment 10 can detect, if there is coverage by its serving and by adjacent Node Bs by listening (and measuring) to the common pilot channel (CPICH). Similarly, in IEEE 802.11 systems, the user equipment 10 can listen to the beacon frame broadcast by WLAN access points so as to detect the coverage provided by an access point.

Measurements on pilot channels within the underlying physical layers can be communicated to the MUP protocol of the user equipment 10. Hence, for UMTS, an interface between UMTS Layer 1 and MUP can be established by exchanging a primitive for notifying the measured value of the Received-Signal-Strength-Indicator (RSSI) in the CPICH to MUP. This primitive can be denoted e.g.: "C-MUP-MEA-SUREMENT-REPORT-IND". This primitive may contain a field for the value of RSSI on the CPICH. This primitive might be sent periodically or upon request; or event triggered to MUP.

In IEEE 802.11 the information on the RSSI of the beacon is available at MAC layer. This information can be forwarded to MUP. For this purpose, a primitive between IEEE 802.11, MAC and MUP can be introduced, which may be called "MUP-MEASUREMENT-REPORT-IND". As a field it can contain the RSSI on the beacon frame. This primitive might be sent periodically or upon request to MUP.

If there is still coverage by access point 101, then it is tested 705 if the acknowledgement transmission delay via access point 101 to the control entity 20 (TAP1) is shorter than the delay via access point 102 (TAP2) plus a threshold Thr1, wherein Thr1 is always a positive value. The information on Thr1 can be transmitted directly to the user equipment 10 or it can be broadcast. Hence it is checked 705 whether:

$$TAP1 < TAP2 - Thr1,$$

wherein TAP1 and TAP2 are the delay values for the acknowledgement transmission from the user equipment 10 to the control entity 20 via access point 101 and access point 102 respectively.

In case the equation evaluated in step 705 is true i.e. the transmission via access point 101 exhibits significant lower delay than the transmission via access point 102. In this case the acknowledgement is transmitted 305 via access point 101.

If the equation in step 705 is false, then it is tested if the delay in these two systems is comparable. In this case, it is tested 706 whether:

$$TAP1 < TAP2 + Thr1,$$

If the equation in step 706 is not satisfied, then the acknowledgement is transmitted 304 via access point 102. Otherwise, the channel quality within both of the systems is compared 707 and the acknowledgement is transmitted via the access point for which the radio channel is better. The algorithm favors (adjustable by the value of Thr1) the acknowledgement transmission 305 directly to access point 101.

Thr1 is a parameter that may be configured by access point 101 at the beginning of the communication and is signaled to the user equipment. It may typically remain unchanged over the communication session. In case the strategy of the network changes during a communication session, a new updated parameter Thr1 can be notified to the user equipment 10.

The parameters TAP1 and TAP2 define the delay of an (negative) acknowledgement transmission via access point 101 and access point 102, as mentioned above. This delay may be the delay between the moment that the error detection (step 702) is performed at the physical layer at the user equipment 10 and the moment the (negative) acknowledgement is received at the MUP layer of the access point 101. The parameter TAP1 is related to transmission via the air interface. In case, access point 101 supports UMTS, then the acknowledgements may be transmitted via dedicated channels and the acknowledgements have the highest priority. Hence they are not buffered before transmission and the transmission delay TAP1 can be equal to the TTI size. Hence, information on TAP1 may be available in the user equipment 10, if access point 101 supports UMTS. In case access point 101 supports IEEE 802.11 the control entity 20 may notify the delay to the user equipment 10 with a message defined in IEEE 802.11h, IEEE 802.11k or higher.

Figure 10:
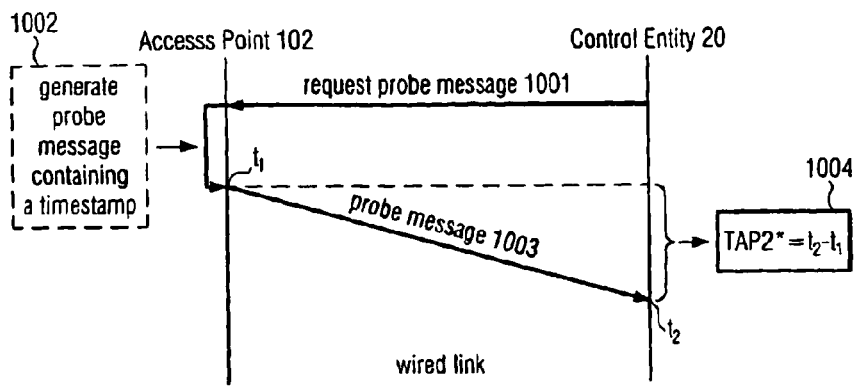
FIG. 10 shows the determination of transmission delays for probe messages sent from an access point to the control entity, according to an embodiment of the invention.
Figure 11:
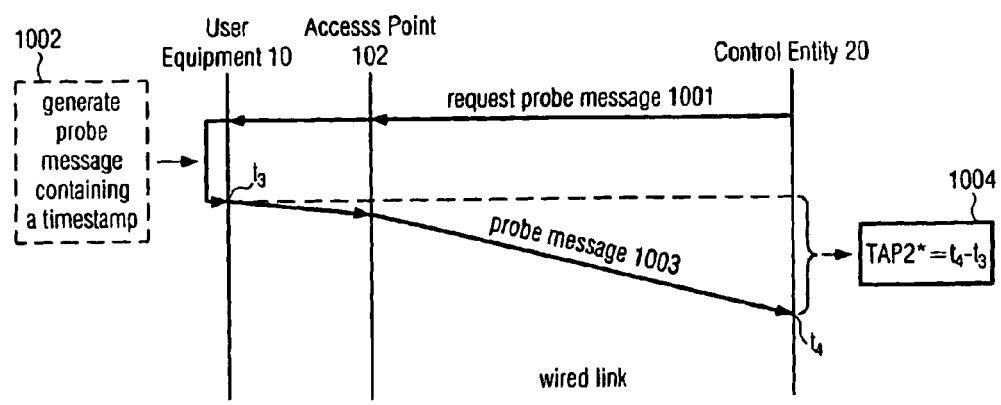
FIG. 11 shows the determination of transmission delays for probe messages sent from the user equipment to the control entity, according to an embodiment of the invention.

TAP2, the transmission delay for sending acknowledgement messages from the user equipment to the control entity via access point 102 (see FIG. 1), depends on the delay via the cable connecting access point 102 and access point 101, containing the control entity 20. In case access point 102 supports IEEE 802.11 then the TAP2 may be predicted e.g. by sending a probe message from the user equipment 10 to the control entity as can be seen in FIG. 10 or 11. The delay may depend on the number of users queued in the system.

The parameters QAP1 and QAP2 define the experienced Signal to Noise Ratio over the radio channel between the user equipment 10 and access point 101 and access point 102, respectively. The channel quality in UMTS/HSDPA and IEEE 802.11 systems may be given by measurements on the CPICH channel and on the beacon frame. Hence, this information is available in the physical layers of the multi-radio terminal; consequently it may be forwarded to the MUP protocol of the user equipment 10.

Figure 8:
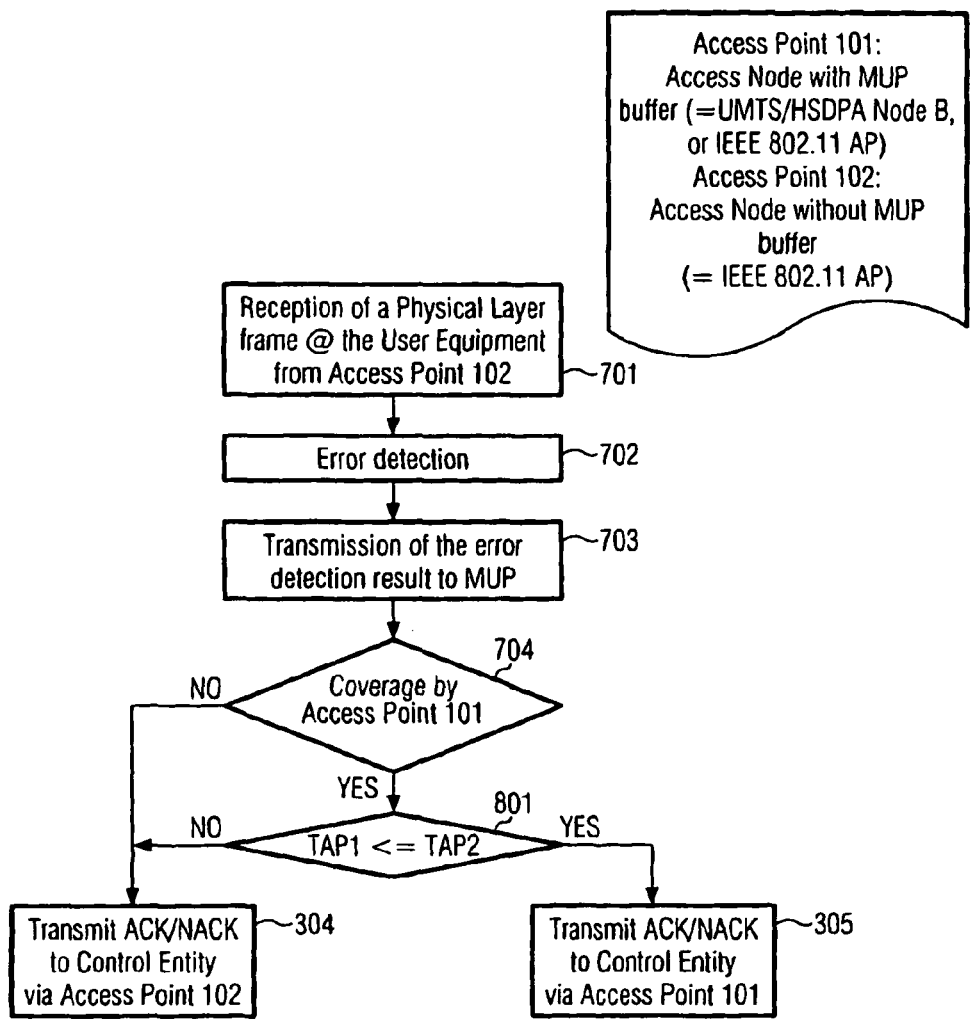
FIG. 8 shows a flow-chart of another method for selecting an access point for acknowledgment transmission according to an embodiment of the invention.

FIG. 8 shows a flow-chart of another method for selecting an access point for acknowledgment transmission according to an embodiment of the invention. The user can be situated in the network scenario shown in FIG. 1. The selection algorithm may be performed by the user equipment 10.

The method proposed in this embodiment may be advantageous as it allows the reduction of power consumption and of computing time of the user equipment 10. The selection procedure works in analogy to that presented in FIG. 7 without taking the channel quality into account. Further, the step of comparing the transmission delays 801 is simplified.

Acknowledgement messages are sent to the access point offering the minimum transmission delay.

The access point selection can be even further simplified. In case a network scenario as shown in FIG. 1 is assumed and the wired link between access point 101 and access point 102 is one-to-one connection and the link is not shared with other access points or other services and uplink and downlink are realized by individual links. In this case, it can be assumed that the delay for transmission of an acknowledgement via access point 102 is approximately 6 ms.

If the user equipment 10 has been granted a dedicated (signaling) channel with a TTI higher than 2 ms, e.g. 10 ms, then the acknowledgement message should be sent via access point 2. In this scenario the method can e.g. be reduced to: "Send acknowledgement messages via access point 101 in case the TTI-level is below 6 ms, otherwise use access point 102".

Figure 9:
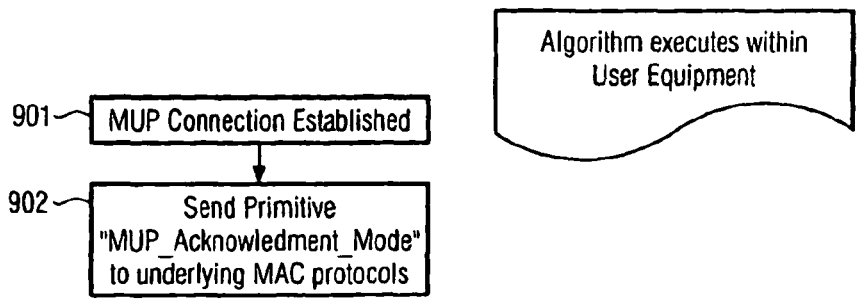
FIG. 9 shows the exchange of inter-layer messages for indicating MUP is executed in acknowledged mode or unacknowledged mode, according to an embodiment of the invention.

FIG. 9 shows the exchange of inter-layer messages for indicating MUP is executed in acknowledged mode or unacknowledged mode, according to an embodiment of the invention. FIG. 9 exemplary further specifies the step of error detection 702 of a physical layer frame shown in FIG. 7 or 8.

It is common that the error detection result at physical layer is made known to Media Access Control (MAC) with appositely defined primitives. This information can be forwarded from MAC to MUP with a primitive. A primitive for communication between the MAC protocol of the underlying Radio Access Technique and MUP may be named "MACRxStatus.indication". This primitive can contain the output of the physical layer detection mechanism "PhyLayErrorDetectionOutput". It can consist of a single bit, e.g. 0 indicates the not successful reception, whilst 1 indicates the correct reception of a packet. In case no error is detected upon reception, then the MAC PDU corresponding to this physical layer frame is forwarded to MUP. In this case, upon reception of this primitive, the MUP protocol within the user equipment 10, decodes the MUP sequence number and it checks the characteristics of the established MUP session, if an acknowledgement is required for this specific connection, then the method steps of FIG. 7 or 8 can be executed.

If the connection does not require an acknowledgement at MUP level, it is proposed that the MUP protocol notifies the underlying MAC protocols of the MUP protocol functioning type, i.e. if the mode is acknowledged or not. This is to avoid unnecessary transmission of the error detection result from underlying MAC protocols to MUP and subsequent MUP commanding MAC protocols to send acknowledgement messages.

Hence, MAC protocols under MUP can forward the error detection result only in the case MUP operates in acknowledged mode. For the same reason, when referring to a network scenario as shown in FIG. 1, access point 102 should be notified by access point 101 of the acknowledgement mode used at MUP level. Hence, when the configuration message, MUP_Config 901, is sent from access point 101 to access point 102, then a field named MUP_Acknowledgment_Mode should be included as well in the list of fields 902. If MUP operates in an unacknowledged mode, then access point 102 does not have to notify access point 101 of the acknowledgements it (AP 102) has received.

The same applies for an information on the transmission delay for an acknowledgement message sent from the user equipment 10 via access point 102 to the control entity 20 (TAP2) in case a network scenario shown in FIG. 1 is assumed. In case MUP operates in unacknowledged mode, the acknowledgement transmission is done according to the technology of the MAC protocol, e.g. IEEE 802.11 or UMTS/HSDPA. The flow-chart depicted in FIG. 9 may not only inform the user equipment 10 on whether MUP is running in acknowledged or unacknowledged mode. The information mechanism may also inform the respective access points (access point 102 in this example) whether MUP is executed in acknowledged or unacknowledged mode. In case MUP is executed in unacknowledged mode, transmission delays e.g. TAP2 have not to be communicated to the user equipment 10.

In the following paragraphs the determination of transmission delays for sending acknowledgement messages from the user equipment 10 to the control entity 20 will be discussed. The expected transmission delays for acknowledgement messages sent from the user equipment 10 to the control entity 20 can be determined by sending probe messages. The probe messages experiences the major transmission delay on the wired part of the link, from the user equipment 10 to the control entity 20. This wired link can be the connection between the control entity 20 and an access point connected to the user equipment 10.

Therefore, according to an embodiment of the invention, probe messages are only sent from the respective access point to the control entity 20. This may reduce e.g. battery power consumption in the user equipment 10. In the following the determination of transmission delays between an access point and the control entity 20 and the determination of the transmission delay between the user equipment 10 and the control entity 20 will be discussed.

FIG. 10 shows the determination of transmission delays for probe messages sent from an access point to the control entity 20, according to an embodiment of the invention. In case a network architecture like the one shown in FIG. 1 is assumed, the essential part of the delay when sending an acknowledgement message from the user equipment 10 via access point 102 to the control entity 20 is contributed by the wired link connecting access point 102 and access point 101. Therefore, the selection of an access point may be based on the delay on the wired link connections in the radio access network.

The control entity 20 demands 1001 a probe message from a respective access point. The access point generates 1002 a probe message containing a timestamp of the time t1 at which the probe message is sent 1003. The probe message arrives at the control entity 20 at the time t2. The transmission delay TAP2* may be determined 1004 by taking the difference t2−t1. The determination of transmission delays using this scheme may be also used to determine the delay if further network elements such as hubs, routers or the like are on the transmission path between an access point and the control entity. The step of requesting 1001 a probe message is optional, for example the access point may send probe messages e.g. in a timely periodical manner such that no explicit request is needed. The control entity 20 may measure the delays for all access points connected to the user equipment 10.

There is a number of other methods for measuring the delay on a wired line connection. Another example, is presented in the corresponding European Patent Application No. 04029710.3 of the same applicant with the title: "Support of guaranteed bit-rate traffic for uplink transmissions".

FIG. 11 shows the determination of transmission delays for probe messages sent from the user equipment 10 to the control entity 20, according to an embodiment of the invention. The full transmission delay from the user equipment 10 to the control entity 20 is determined. The control entity 20 demands 1001 a probe message from the user equipment 10. The user equipment 10 generates 1002 probe messages and subsequently sends 1003 them via at least one of the available access points to the control entity 20. This sending procedure may be performed for more than one access point at the same time or successively.

The probe message contains a timestamp of the time t3 at which the probe message was sent from the user equipment 10 to the respective access point. The access points forwards the probe message via e.g. a wired interface to the control entity 20 at which the probe message arrives at the time t4. The total transmission delay TAP2 may be determined 1004 by simply taking the difference t4–t3. The request 1001 of a probe message is an option. Probe messages may be sent by the user equipment 10 in a periodical manner after reception of a certain amount of data packets, after each data packet, after certain delay time or the like, as indicated above.

Figure 12:
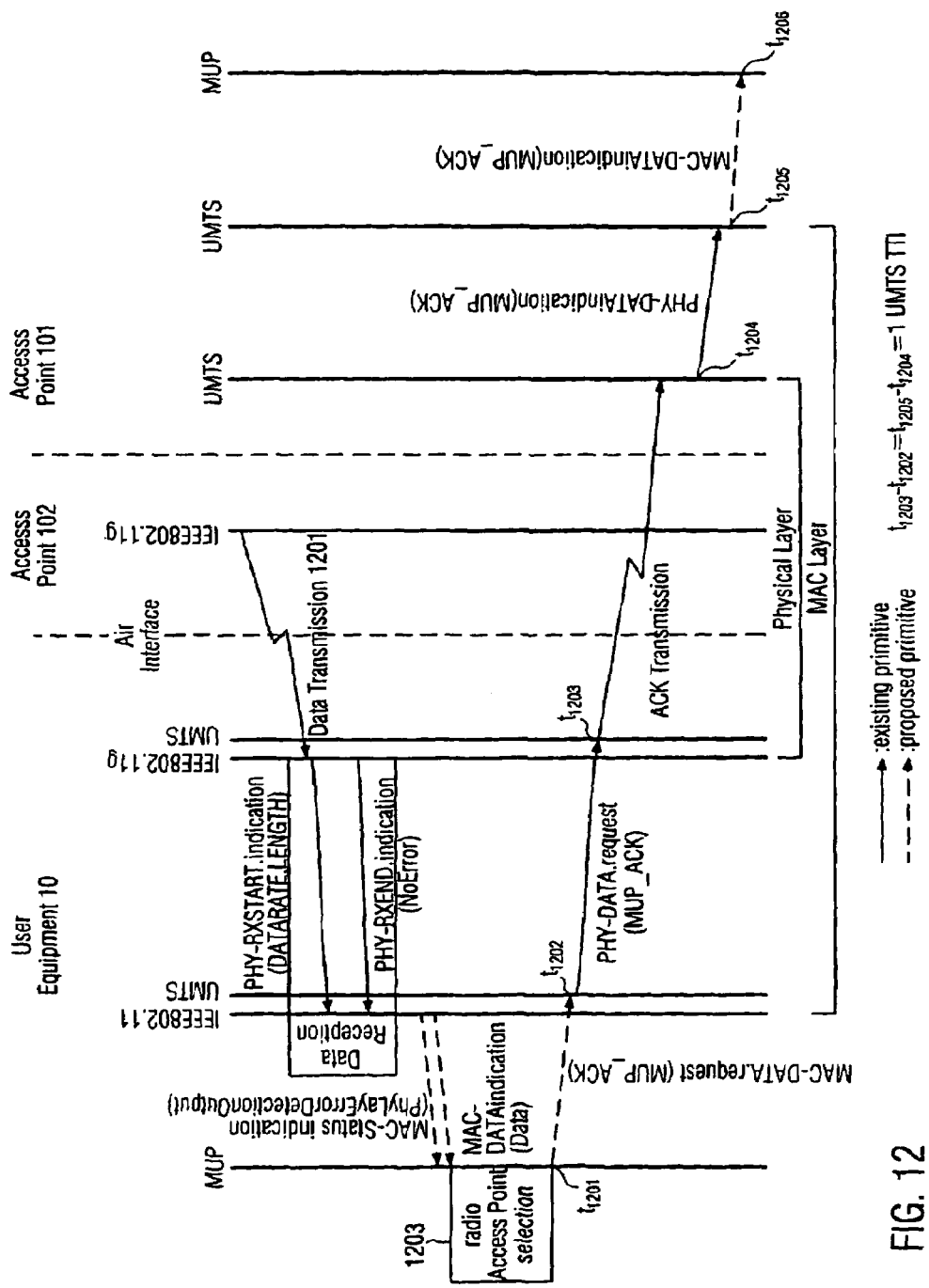
FIG. 12 shows an exemplarily inter-layer messaging and proposed primitives, to be added accordingly to an embodiment of the invention.

FIG. 12 shows an exemplarily inter-layer messaging and proposed primitives, to be added accordingly to an embodiment of the invention. The transmission delay for acknowledgement messages sent from the user equipment to the control entity may be traced, using the mechanism shown in FIG. 12.

In the following the exchange of primitives and messages related to data and feedback transmission between the different protocol layers of a MUP enabled user equipment 10, an IEEE 802.11g access point 102 and a MUP enabled UMTS Node B (access point 101) will be discussed.

Data is transmitted 1201 to the user equipment 10 via access point 102. Both, the access point 102 and the user equipment 10 support IEEE 802.11g. The transmission of acknowledgement messages 1202 is done via access point 101, using UMTS (and its extensions HSDPA, Enhanced Uplink) as the access technology.

A data packet is transmitted 1201 from IEEE 802.11g enabled access point 102 to the user equipment 10. Since the reception is successful (see data reception field in FIG. 12), the proposed primitive "MACRxStatus.indication" with the proposed field "PhyLayErrorDetectionOutput" can be transmitted from the IEEE 802.11g MAC layer to MUP.

Subsequently, the proposed primitive "MAC-DATA.indication" with the correctly received MUP Physical Data Unit (PDU) is transmitted from the MAC layer to MUP in the user equipment 10.

Subsequent to data reception an access point selection algorithm 1203 according to an embodiment of the invention (e.g. see FIGS. 3-8), selecting an access point acknowledgment messages are to be sent can be executed by the user equipment 10.

An acknowledgement message sent from the MUP protocol layer within the MUP enabled user equipment 10 can transmit the newly defined primitive "MAC DATA.request" to the MAC protocol of the user equipment 10. The primitive "MAC-DATA.request" may contain a field "MUP_ACK". The field "MUP_ACK" can consist of N+1 bits. The first bit can specify if the MUP PDU is correctly received or not; this might be indicated e.g., by the values 1 and 0 respectively. The other N bits can specify the MUP sequence number of the MUP PDU for which this primitive is transmitted.

The further acknowledgement transmission from the MAC layer of the user equipment 10 to the MAC layer of access point 101 is performed is a straight forward way using existing primitives.

At the receiver side i.e. the UMTS enabled access point 101, a primitive between the MAC protocol and MUP so as to notify the reception of an acknowledgement can be introduced as well. This primitive may also be introduced in the case the respective access point supports a radio access technology different from UMTS. The primitive can be named "MAC-DATA.indication" and may contain a field "MUP_ACK" with the characteristics described above.

A chronological tracing of the acknowledgement message sent from the user equipment 10 to access point 101 indicated in FIG. 1 by t1201-t1206 can be performed during acknowledgement transmission. The transmission delay may be estimated by taking the difference of t1206 and t1201.

The transmission delay value that the acknowledgement message experienced may be transmitted from the control entity located in access point 101 to the user equipment 10 via the beacon frame in the IEEE 802.11 technology. For this purpose an appositely defined primitive, named "MAC_Wired_Line_Delay.indication" may be defined. This primitive may be exchanged between the IEEE 802.11 MAC and MUP and may contain the value of the transmission delay.

The transmission delay for sending acknowledgement messages via access point 101, in case the access point supports UMTS and its evolutions and the user equipment 10 is allocated a dedicated channel in uplink, may be equal to the TTI value (2, 10, 20, 40, 80 ms). In the scenario of coupled radio access technologies discussed here, dedicated channels may be used in UMTS. Hence; the delay of transmission via access point 101 may be equal to the TTI size, independently of the number of MUP PDUs waiting at the input of the dedicated transport channels to be transmitted. The reason for this is that acknowledgements are considered to be control signaling, hence, they are transmitted without any buffering delay.

Figure 13:
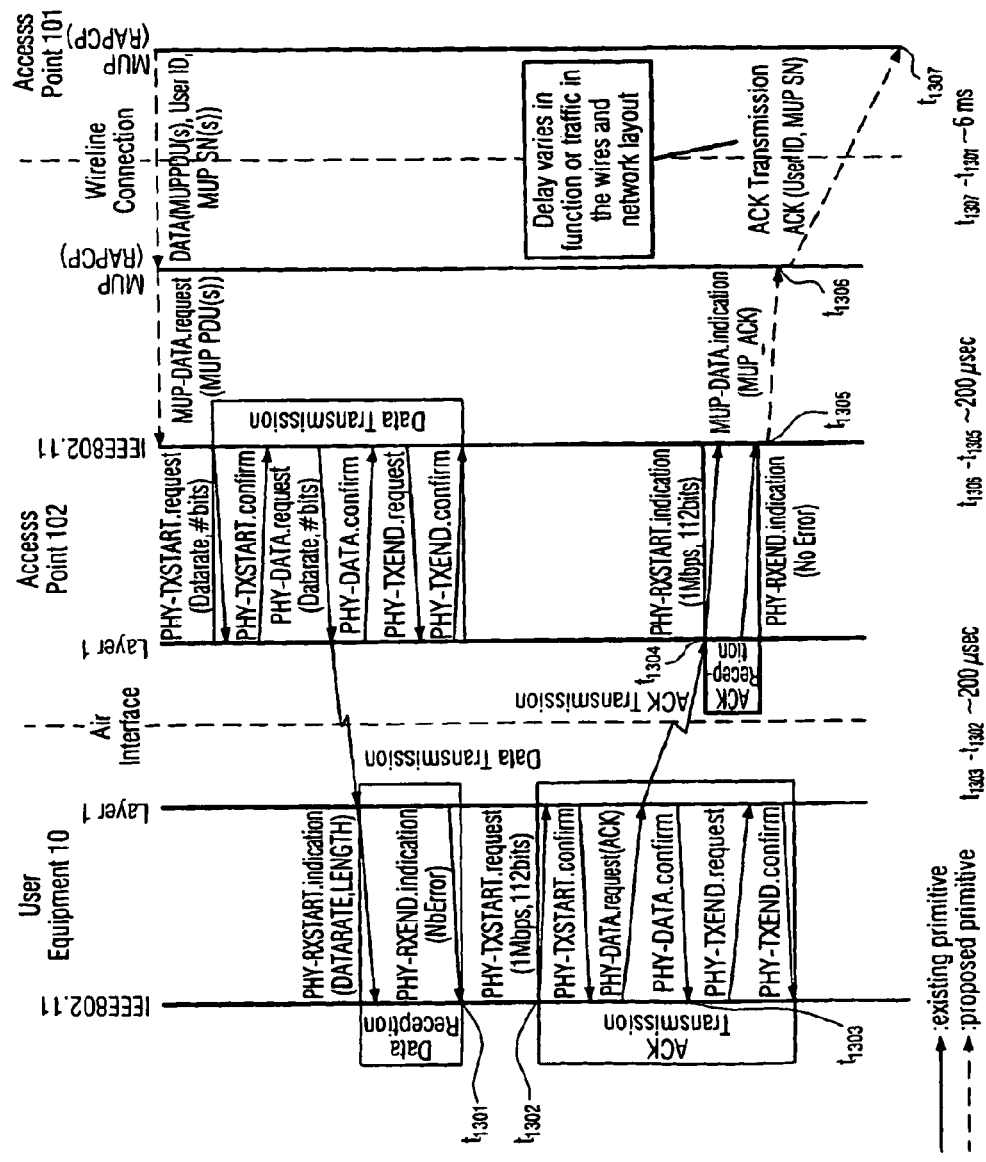
FIG. 13 shows a further example of the interlayer messaging for data transmission from an IEEE802.11 access point to the user equipment.

FIG. 13 shows a further example of the interlayer messaging for data transmission from an IEEE802.11 access point to the user equipment 10. Further, FIG. 13 shows the acknowledgment transmission including chronological tracing of the acknowledgement message sent from the user equipment 10 to an UMTS Node B.

Acknowledgement transmission is traced along the path beginning at the moment the error detection mechanism finishes (t1301), and stops at the moment the acknowledgement reaches the MUP protocol of access point 101 (t1307). In particular, t1301 defines the time at which decoding of the data packet including header and data at the physical layer finishes and the data is forwarded to the MUP layer. The time at which the acknowledgement message, acknowledging the aforementioned data packet, reaches the MUP buffer, providing data packets for possibly retransmission, is denoted as t1307. The total delay time mainly depends on the transmission delay on the wired link between access point 101 and access point 102 i.e. the time interval defined by the difference of t1307 and t1306. This particular delay time (media delay) depends on the length and the type of wired link used for connecting access point 101 and access point 102 (e.g. coax cable, optical fiber, etc.). A typical value can be assumed to by about 5 ms.

In case of a point-to-point wired connection between access point 101 and access point 102, the minimum total transmission delay, defined by the difference of t1307 and t1301, for an acknowledgement transmission will be approximately 6 ms.

Figure 14:
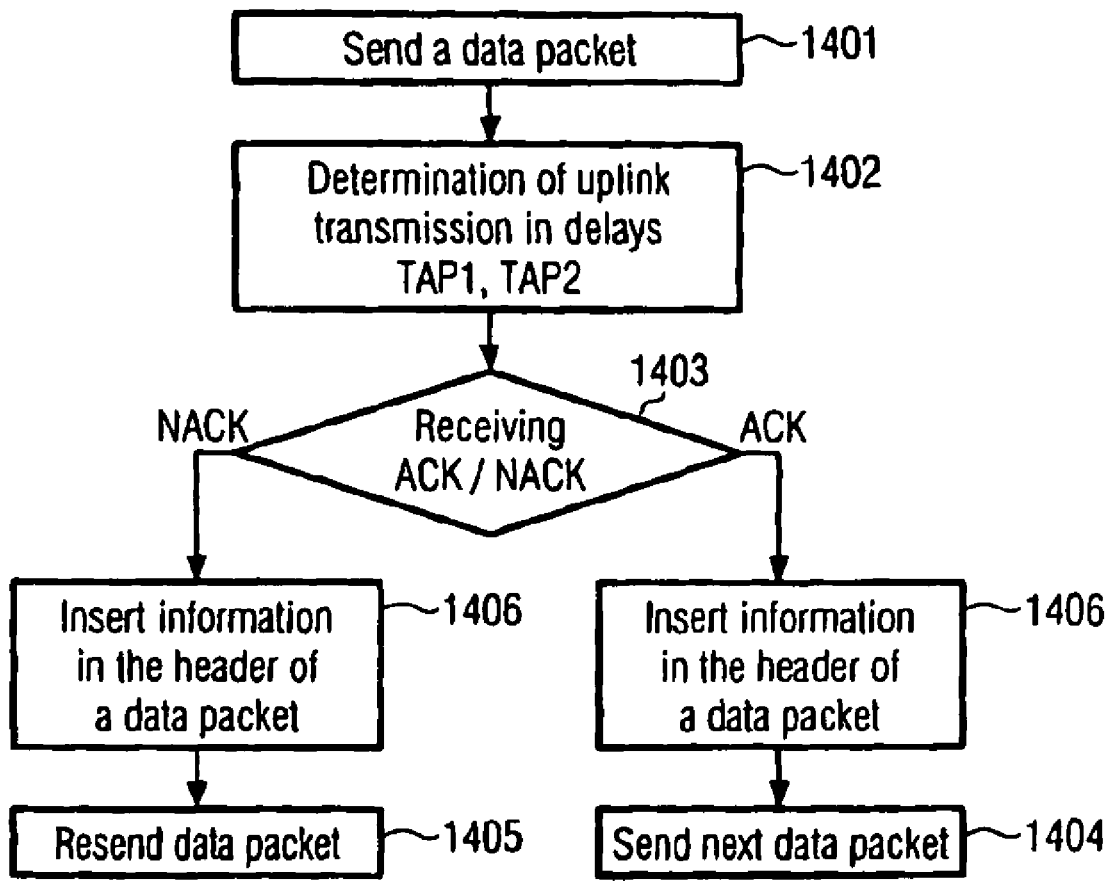
FIG. 14 shows a flow-chart of a method for sending data packets and receiving the corresponding acknowledgement messages, according to an embodiment of the invention.

FIG. 14 shows a flow-chart of a method for sending data packets and receiving the corresponding acknowledgement messages, according to an embodiment of the invention. The steps in FIG. 14 can be executed by the control entity 20. The control entity 20 can be connected to the core network, and can further implement the IP- and a MUP-protocol. The access points and the control entity 20 may be coupled with help of the MUP protocol. A link layer buffer used by MUP may be part of the control entity 20 that is again located in access point 101. The MUP buffer stores IP-packets and segments them in different MUP PDU-sizes depending on the MAC PDU-size of the underlying RAT. Details will be discussed in connection with FIG. 16. The link layer buffer can also manage retransmission of data packets by keeping transmission/retransmission counters and transmission window counters.

The control entity 20 sends 1401 a data packet to the user equipment 10. The data packet can be sent via a first access point or a second access point or via both access points (for example access point 101 and access point 102 in FIG. 1).

As a further step the control entity 20 determines 1402 the uplink transmission delays TAP1, TAP2. Subsequent, depending on whether an acknowledgement or a non-acknowledgement message is received 1403 by the control entity 20, the next data packet is sent 1404 or the last data packet is resent 1405. Previous to sending a data packet to the user equipment 10, information is added to a field in the header of the data packet 1406.

This information may comprise the value of the threshold t* or Thr1, the address (e.g. IP-address) of the control entity 20, determined transmission delays TAP1, TAP2 or the like. By adding the aforementioned information to the header of a data packet, explicit signaling of the respective parameters causing additional traffic can be omitted.

The step of determining 1403 the uplink transmission delays may e.g. be performed according to the method shown in FIG. 7 or 8, i.e. by sending a probe message or alternatively by tracing an acknowledgement message as shown in FIGS. 12 and 13.

The step of determining 1403 transmission delays can be further modified in that a channel quality of a communication channel between a respective on of access points 101 or 102 is determined, instead of a transmission delay. The channel quality may be further used by the user equipment as a criterion for access point selection.

The user equipment 10 may also be aware of the address of the control entity 20, i.e. the address of the network element comprising the control entity 20. This information may be of relevance, since the user equipment 10 may need to know to which access point it should send the acknowledgement messages. Address Information can be transmitted to the user equipment 10 when the MUP connection is established via explicit signaling, e.g. using a MUP configuration message. Alternatively, this information may be broadcasted via one of the available access points, e.g. by inserting this information in the header of a data packet broadcast to the user equipment 10. If the access point supports UMTS, then this information can be sent via the Broadcast Control Channel (BCCH). In case the respective access point supports the IEEE 802.11 technology, then the beacon frame can be used so as to broadcast this information.

Figure 15:
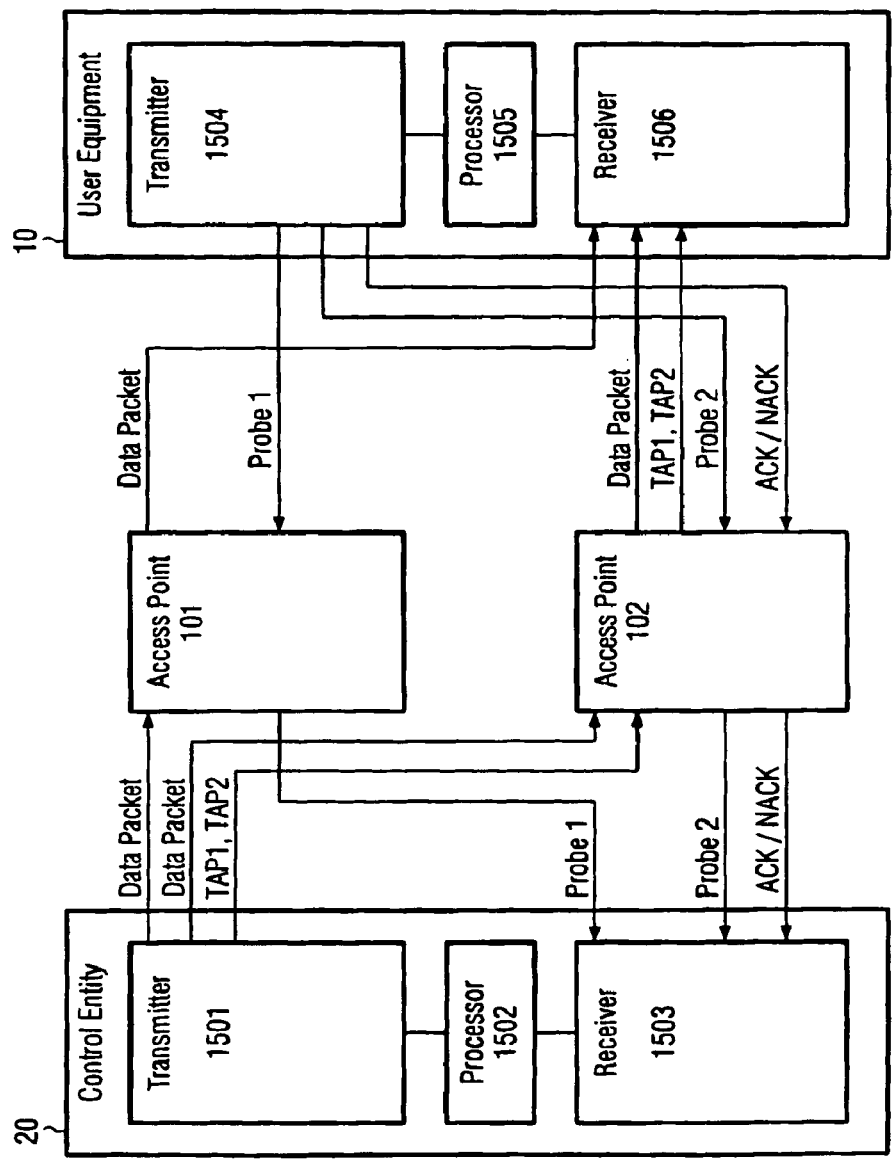
FIG. 15 shows a systematical overview of a system according to an embodiment of the invention, comprising a control entity two access points and a user equipment.

FIG. 15 shows a systematical overview of a system according to an embodiment of the invention, comprising a control entity 20, two access points 101 and 102, and a user equipment 10. The control entity 20 comprises a transmitter 1501, a processor 1502 and a receiver 1503. The user equipment 10 also contains a transmitter 1504, a processor 1505 and a receiver 1506.

The control entity 20 provides a packet data service via access point 101 and access point 102 using the transmitter 1501, to the user equipment 10. The data packets of the service are received by the receiver 1506 of the user equipment 10. Upon detection of the reception of a data packet, the processor 1505 of the user equipment 10 causes the transmitter 1504 to send probe messages, probe message 1 via access point 101 and probe message 2 via access point 102 to the receiver 1503 in of the control entity 20. Upon reception of probe messages the processor 1502 of the control entity 20 may evaluate the timestamps in the probe messages and determines the transmission delays TAP1 and TAP2, the respective probe message experienced. Furthermore, the respective transmission delays are transmitted by the transmitter 1501 of the control entity 20 via access point 102 to the receiver 1506 of the user equipment 10. Upon detection of the reception of the information on the transmission delays, the processor 1505 of the user equipment 10 is capable of performing the selection via which access point the acknowledgement messages, acknowledging the reception of data packets are sent. The processor 1505 may cause the transmitter 1504 to send acknowledgement messages via access point 102 to the receiver 1503 of the control entity 20.

Optionally, the transmission delays TAP1 and TAP2 may be determined periodically or event triggered. Further, the channel quality of the uplink channels via which acknowledgement messages and/or probe messages are sent from the user equipment 10 to the control entity 20 may be taken into account when performing access point selection.

Figure 16:
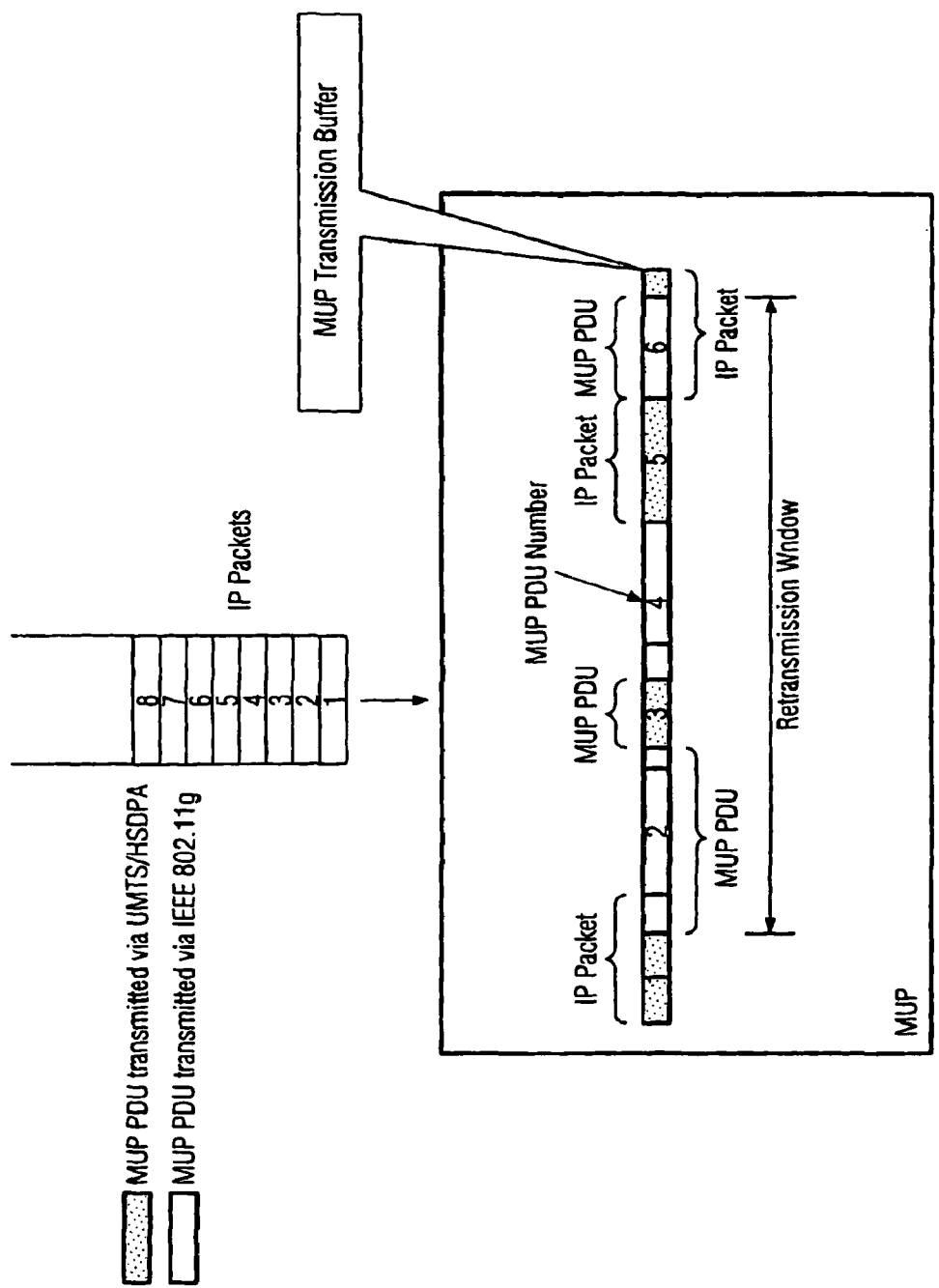
FIG. 16 shows an exemplary MUP-buffer that is a part of the control entity according to an embodiment of the invention.

FIG. 16 shows an exemplary MUP-buffer that is a part of the control entity 20 according to an embodiment of the invention. Coupling among different Radio Access Technologies with the aid of the MUP protocol, involves also the existence of a link layer buffer within MUP. The buffer typically stores IP packets and segments them in different MUP Physical Data Units (PDU), depending on the MAC PDU size of the underlying radio access technology. The MUP PDUs may have different sizes that depend on the radio access technology used for their transmission. The MUP buffer may manage data packet retransmissions by keeping transmission/retransmission counters and transmission window counters.

The following FIGS. 17 and 18 relating to the reception of a physical data unit within an IEEE 802.11 enabled network element e.g. the user equipment 10 will be discussed. Further, an error detection mechanism causing the respective network element to send an acknowledgement or a negative acknowledgement will be described.

Figure 17:
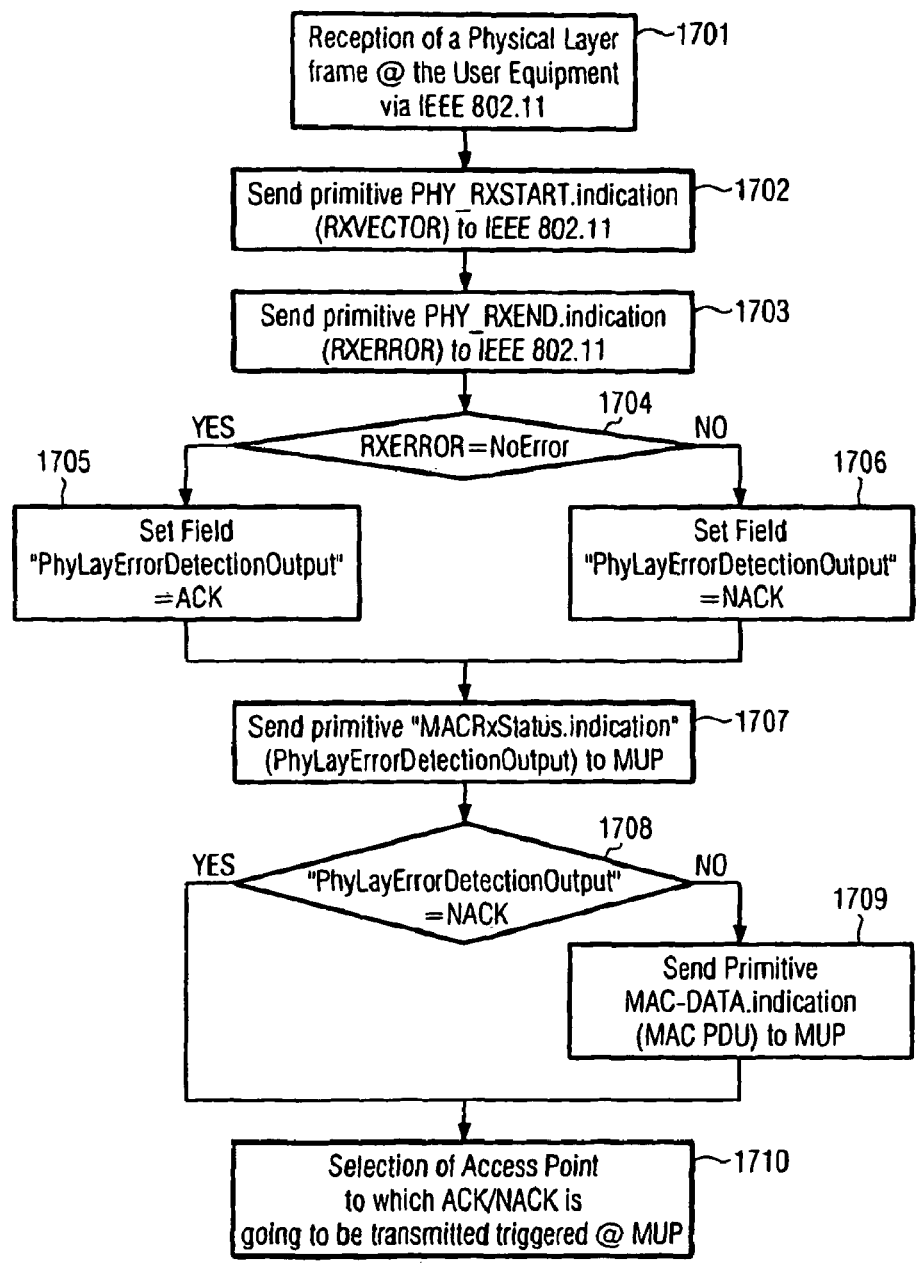
FIG. 17 shows an exemplarily flow-chart of a method for selecting whether an acknowledgement or no acknowledgement has to be sent to the control entity, according to an embodiment of the invention.

FIG. 17 shows an exemplarily flow-chart of a method for selecting whether an acknowledgement or negative acknowledgement has to be sent to the control entity, according to an embodiment of the invention. The selection is based on the error detection at physical layer and may be performed by the user equipment 10. The method presented in FIG. 17 refers to the step of error detection 702 in FIG. 7 or 8.

Figure 18:
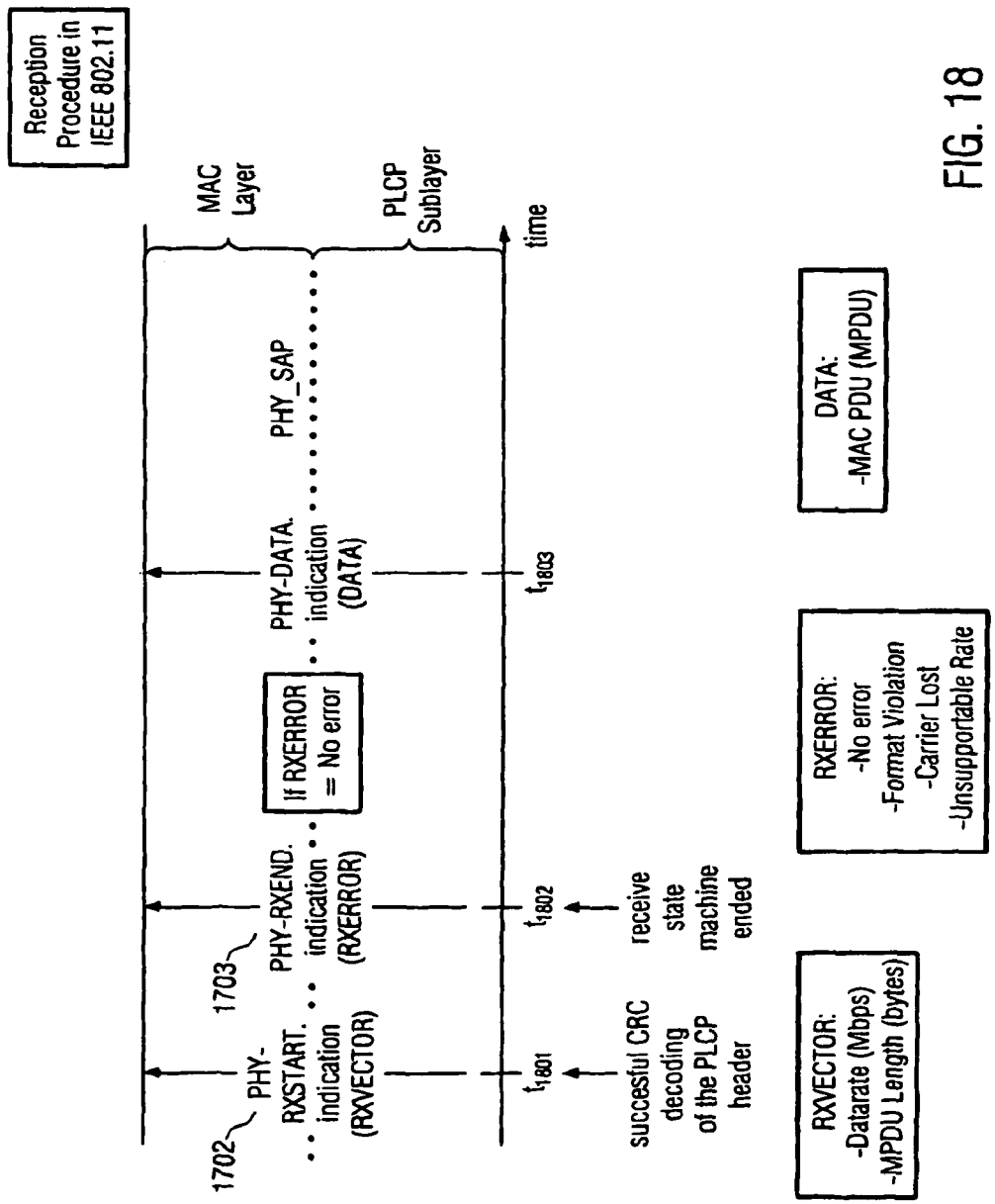
FIG. 18 shows a timeline for interlayer messaging related to the reception of a physical data unit at physical layer within an IEEE 802.11 enabled network element.

FIG. 18 shows a timeline for interlayer messaging related to the reception of a physical data unit at physical layer within an IEEE 802.11 enabled network element. The data is forwarded from physical layer (using physical layer convergence protocol—PLCP) to MAC layer. The interface between these two protocols, the service access point is indicated in FIG. 18 as PHY_SAP.

In the following both FIGS. 17 and 18 will be discussed in a shared description. Upon reception 1701 of a physical data unit at Physical Layer (PLCD), cyclic redundancy checksum (CRC) decoding is performed. A primitive "PHY_RX-START.indication" can be transmitted 1702 from PLCP layer to MAC, indicating the beginning of reception at the physical layer. This step is performed at a time t1801 as indicated in FIG. 18.

Further, the physical layer notifies the MAC layer of the end of reception 1703 by transmitting the "PHY_RXEND-.indication" primitive. This primitive can contain the field "RxError", which indicates whether or not the physical layer frame is correctly received, i.e. no format violation or loss of carrier has been encountered or an unsupported data rate has been used. The data reception at physical layer end at the time t1802 (see FIG. 18).

In step 1704 the selection mechanism performed by the user equipment 10 decides whether an acknowledgement message (ACK) 1705 or a negative acknowledgement message (NACK) 1706 has to be sent to the control entity 20. The proposed field "PhyLayErrorDetectionOutput" known from the description of FIG. 12 is subsequently set to ACK and NACK respectively. This primitive comprising the result of the error detection mechanism at physical layer may be transmitted to MUP 1707.

In step 1708 of the selection mechanism the user equipment 10 decides whether to send an acknowledgement or a negative acknowledgement to the control entity 20. In case the proposed field "PhyLayDetectionErrorOutput" equals NACK a negative acknowledgement message is sent 1710 to the control entity 20. In the case the proposed field "PhyLayDetectionErrorOutput" is not equal to NACK, the MAC physical data unit is forwarded to the MUP layer 1709, and an acknowledgement message is sent 1710 to the control entity 20. The PDU is forwarded to MUP at a time t1803 as indicated in FIG. 18.

The mechanism described above can take place within the IEEE 802.11 MAC protocol of the user equipment 10. Similarly, this mechanism may be executed within the UMTS/HSDPA MAC protocol of the control entity 20 (the appropriate primitive names changed appropriately).

The invention claimed is:

1. A method for selecting a radio access point of a network through which delivery of packets of a packet data service to a mobile terminal is to be acknowledged, wherein the network comprises a control entity controlling acknowledgement of the delivery of packets of the packet data service to the mobile terminal, the method comprising the following steps performed by the mobile terminal:
   receiving packets of the packet data service via at least two radio access points;
   determining, for a respective one of the at least two radio access points, a selection criterion associated to the respective radio access point based on an expected transmission delay experienced by an acknowledgement message sent to the control entity on at least a part of a transmission path from the mobile terminal to the control entity via the respective radio access point;
   selecting one of the at least two radio access points based on the determined selection criteria; and
   transmitting at least one acknowledgment message to the control entity through the selected radio access point,
   wherein said selection criterion is the expected transmission delay and wherein the radio access point offering a minimum transmission delay is selected.

2. The method according to claim 1, wherein the control entity is located in one of the at least two radio access points.

3. The method according to claim 1, wherein said selection criterion additionally takes into account a channel quality of a channel between the communication terminal and the respective radio access point.

4. The method according to claim 1, wherein the step of selecting a radio access point for sending at least one acknowledgement message is performed upon each reception of a data packet or in a periodical manner; or wherein the step of selecting a radio access point for sending at least one acknowledgement message is performed based on event triggering.

5. The method according to claim 1, further comprising the step of averaging values of a selection criterion determined for a respective radio access point and taking the averaged value as a basis of a new selection criterion.

6. The method according to claim 1, further comprising the step of communicating an address of the control entity to a new radio access point upon setup of a connection from the mobile terminal to the new radio access point.

7. The method according to claim 1, further comprising the step of requesting the transmission delays from the network.

8. The method according to claim 1, wherein the radio access points in a radio network, the mobile terminal and the control entity implement the Multi-Radio-Unification Protocol (MUP).

9. A method for transmitting information on at least two radio access points of a network to a mobile terminal, wherein the network comprises a control entity controlling acknowledgement of the delivery of packets of a packet data service to the mobile terminal, the method comprising the following steps performed by the control entity:
   sending packets of the packet data service to the mobile terminal via at least two radio access points;
   determining, for a respective one of the at least two radio access points, information on an expected transmission delay experienced by an acknowledgement message received from the mobile terminal on at least a part of a transmission path from the mobile terminal to the control entity via the respective radio access point;
   transmitting the information on the expected transmission delay to the mobile terminal; and
   receiving at least one acknowledgment message from the mobile terminal via a radio access point selected by the mobile terminal based on the experienced transmission delay.

10. The method according to claim 9, wherein each of the at least two radio access points is connected to the mobile terminal via at least one communication channel, and wherein the method further comprises the steps of:
    determining, for a respective one of the at least two radio access points, information on a channel quality of the respective channel to the mobile terminal, and
    communicating said information on the channel quality to the mobile terminal.

11. The method according to claim 9, wherein said steps of determining and transmitting information on the transmission delays or the channel qualities are performed periodically upon each reception of a data packet or upon request.

12. The method according to claim 9, further comprising the step of averaging values of transmission delays or channel qualities determined for a respective radio access point; and communicating the averaged values to the mobile terminal.

13. The method according to claim 9, further comprising the step of communicating an address of said control entity to the mobile terminal upon setup of a new connection.

14. The method according to claim 9, wherein the step of determining transmission delays further comprises tracing acknowledgement messages sent from the mobile terminal to the control entity using a respective radio access point.

15. The method according to claim 9, wherein said step of determining transmission delays is performed in a periodical manner, on a per packet basis or upon request.

16. The method according to claim 9, wherein the step of determining transmission delays further comprises receiving probe messages allowing the control entity to determine the delay experienced by the probe message on at least a part of the transmission path from the respective radio access point to the control entity.

17. The method according to claim 16, wherein the probe message comprises a timestamp indicating the time at which the probe message has been sent by the radio access point.

18. A mobile terminal apparatus used in a radio communication network, the radio communication network further comprising a control entity controlling acknowledgement of the delivery of packets of a packet data service provided to the mobile terminal, and at least two radio access points, the mobile terminal comprising:
- a receiver to receive packets of a packet data service via at least two radio access points,
- a processing unit to determine a selection parameter associated to a respective one of the at least two radio access points based on a transmission delay experienced by an acknowledgement message sent to the control entity on at least a part of a path from the mobile terminal to the control entity controlling acknowledgement of the delivery of packets;
- wherein the processing unit is configured to select one of the at least two radio access points based on the selection parameter; and
- a transmitter to transmit at least one acknowledgment message to the control entity through the selected radio access point,
- wherein the selection parameter is the expected transmission delay; and
- wherein the radio access point offering a minimum transmission delay is selected.

19. A system comprising:
- a mobile terminal according to claim 18
- a control entity used in a radio communication network, the radio communication network comprising a mobile terminal and at least two radio access points through which a packet data service is provided, to the mobile terminal, the control entity comprising a transmitter to transmit packets of the packet data service to the mobile terminal via at least two radio access points, and a processing unit to determine, for a respective one of the at least two radio access points, information on an expected transmission delay experienced by an acknowledgement message sent by the mobile terminal on at least a part of a transmission path from the mobile terminal to the control entity via the respective radio access point, wherein the transmitter is configured to transmit the information on the expected transmission delay to the mobile terminal; and
- a receiver to receive at least one acknowledgment message from the mobile terminal via a radio access point selected by the mobile terminal based on the experienced transmission delay; and
- at least two radio access points.

20. A control entity used in a radio communication network, the radio communication network further comprising a mobile terminal and at least two radio access points through which a packet data service is provided, to the mobile terminal, the control entity comprising:
- a transmitter to transmit packets of the packet data service to the mobile terminal via at least two radio access points;
- a processing unit to determine, for a respective one of the at least two radio access points, information on an expected transmission delay experienced by an acknowledgement message sent by the mobile terminal on at least a part of a transmission path from the mobile terminal to the control entity via the respective radio access point;
- wherein the transmitter is configured to transmit the information on the expected transmission delay to the mobile terminal; and
- a receiver to receive at least one acknowledgment message from the mobile terminal via a radio access point selected by the mobile terminal based on the experienced transmission delay.

21. The control entity according to claim 20, further comprising a buffer, storing packets of the packet data service for retransmission to the mobile terminal, in case of negative acknowledgement.

* * * * *